United States Patent
Jain et al.

(10) Patent No.: US 11,042,454 B1
(45) Date of Patent: Jun. 22, 2021

(54) RESTORATION OF A DATA SOURCE

(71) Applicant: Amazon Technologies, Inc., Seattle, WA (US)

(72) Inventors: Rachit Jain, Bothell, WA (US); Rohit Raj, Seatle, WA (US); Ian Leung, Seatle, WA (US); Harshad Vasant Kulkarni, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 275 days.

(21) Appl. No.: 16/197,033

(22) Filed: Nov. 20, 2018

(51) Int. Cl.
*G06F 11/14* (2006.01)
*G06F 16/23* (2019.01)

(52) U.S. Cl.
CPC ...... G06F 11/1471 (2013.01); G06F 11/1451 (2013.01); G06F 11/1469 (2013.01); G06F 16/2358 (2019.01); *G06F 2201/80* (2013.01)

(58) Field of Classification Search
CPC ............. G06F 11/1471; G06F 16/2358; G06F 11/1451; G06F 11/1469; G06F 2201/80
USPC ........................................................ 707/682
See application file for complete search history.

(56) References Cited

U.S. PATENT DOCUMENTS

| | | | |
|---|---|---|---|
| 5,586,264 A | 12/1996 | Belknap et al. | |
| 5,615,364 A | 3/1997 | Marks | |
| 5,692,177 A | 11/1997 | Miller | |
| 5,768,527 A | 6/1998 | Zhu et al. | |
| 5,813,009 A | 9/1998 | Johnson et al. | |
| 5,842,222 A | 11/1998 | Nishimura et al. | |
| 5,991,772 A | 11/1999 | Doherty et al. | |
| 6,085,200 A | 7/2000 | Hill et al. | |
| 6,161,109 A | 12/2000 | Matamoros et al. | |
| 6,199,074 B1 | 3/2001 | Kern et al. | |
| 6,272,598 B1 | 8/2001 | Arlitt et al. | |
| 6,374,266 B1 | 4/2002 | Shnelvar | |
| 6,374,267 B1 | 4/2002 | Tam | |
| 6,397,351 B1 | 5/2002 | Miller et al. | |
| 6,505,216 B1 | 1/2003 | Schutzman et al. | |

(Continued)

FOREIGN PATENT DOCUMENTS

| | | |
|---|---|---|
| CN | 104750773 | 7/2015 |
| JP | 2014141343 | 8/2014 |
| WO | 2012168365 | 12/2012 |

OTHER PUBLICATIONS

Amazon Web Services, "Amazon DynamoDB Developer Guide", API Version, Aug. 10, 2012, pp. 1-793.

(Continued)

*Primary Examiner* — Evan Aspinwall
(74) *Attorney, Agent, or Firm* — Robert C. Kowert; Kowert, Hood, Munyon, Rankin & Goetzel, P.C.

(57) ABSTRACT

Restoring data to a data store that suffered corrupted data over a time period is disclosed. A system may provide an interface to specify a time window and filter conditions for identifying corrupted data in an object in a data store, such as, but not limited to, a corrupted NoSQL table. Corrupted data is identified by applying the filter conditions to change logs for the data object (e.g., the No SQL table) in the data store. Repair operations are determined for individual items identified via the filter conditions. Identified corrupted data for items may be corrected, from change logs or backup data in some instances (e.g., data may be deleted, or updated or replaced with data from a backup of the data store when necessary).

20 Claims, 10 Drawing Sheets

(56) References Cited

U.S. PATENT DOCUMENTS

| | | |
|---|---|---|
| 6,651,077 B1 | 11/2003 | East et al. |
| 6,728,879 B1 | 4/2004 | Atkinson |
| 7,096,392 B2 | 8/2006 | Sim-Tang |
| 7,328,226 B1 | 2/2008 | Karr et al. |
| 7,330,859 B2 | 2/2008 | Gupta et al. |
| 7,343,356 B2 | 3/2008 | Prahlad et al. |
| 7,353,241 B2 | 4/2008 | Erlingsson |
| 7,373,364 B1 | 5/2008 | Chapman |
| 7,386,586 B1 | 6/2008 | Headley et al. |
| 7,509,358 B1 | 3/2009 | Bingham et al. |
| 7,546,428 B1 | 6/2009 | McAndrews et al. |
| 7,565,661 B2 | 7/2009 | Sim-Tang |
| 7,606,481 B2 | 10/2009 | Kuruma |
| 7,606,841 B1 | 10/2009 | Ranade |
| 7,606,844 B2 | 10/2009 | Kottomtharayil |
| 7,653,668 B1 | 1/2010 | Shelat et al. |
| 7,657,781 B1 | 2/2010 | Dixon et al. |
| 7,668,876 B1 | 2/2010 | Kulkarni |
| 7,680,843 B1 | 3/2010 | Panchbudhe et al. |
| 7,689,597 B1 | 3/2010 | Bingham et al. |
| 7,716,186 B2 | 5/2010 | Cannon et al. |
| 7,730,034 B1 | 6/2010 | Deflaux et al. |
| 7,792,802 B1 | 9/2010 | Rao |
| 7,802,001 B1 | 9/2010 | Petry et al. |
| 7,921,077 B2 | 4/2011 | Ting et al. |
| 7,949,662 B2 | 5/2011 | Farber et al. |
| 8,041,679 B1 | 10/2011 | Narayanan |
| 8,065,278 B2 | 11/2011 | Beatty et al. |
| 8,078,582 B2 | 12/2011 | Wang et al. |
| 8,095,745 B1 | 1/2012 | Schmidt et al. |
| 8,108,343 B2 | 1/2012 | Wang et al. |
| 8,117,164 B2 | 2/2012 | Spektor et al. |
| 8,161,255 B2 | 4/2012 | Anglin et al. |
| 8,166,263 B2 | 4/2012 | Prahlad et al. |
| 8,190,960 B1 | 5/2012 | Bahadur et al. |
| 8,200,615 B2 | 6/2012 | Halliday |
| 8,244,679 B1 | 8/2012 | Bilsborough |
| 8,255,739 B1 | 8/2012 | Chatterjee et al. |
| 8,332,842 B2 | 12/2012 | Bauer et al. |
| 8,359,596 B2 | 1/2013 | Kobayashi et al. |
| 8,364,648 B1 | 1/2013 | Sim-Tang |
| 8,386,631 B2 | 2/2013 | Nilsson et al. |
| 8,386,771 B2 | 2/2013 | Baker et al. |
| 8,463,633 B2 | 6/2013 | Jung et al. |
| 8,488,661 B2 | 7/2013 | Menon et al. |
| 8,510,270 B2 | 8/2013 | Pareek et al. |
| 8,521,695 B2 | 8/2013 | Zwilling et al. |
| 8,533,478 B2 | 9/2013 | Aguilera et al. |
| 8,543,746 B2 | 9/2013 | Roever |
| 8,478,726 B2 | 10/2013 | Hawton |
| 8,548,945 B2 | 10/2013 | Dwyer et al. |
| 8,566,286 B1 | 10/2013 | Hawton et al. |
| 8,572,091 B1 | 10/2013 | Sivasubramanian et al. |
| 8,612,700 B1 | 12/2013 | Armstrong et al. |
| 8,626,709 B2 | 1/2014 | Isaacson et al. |
| 8,635,187 B2 | 1/2014 | Beatty et al. |
| 8,650,155 B2 | 2/2014 | Corbin et al. |
| 8,676,752 B2 | 3/2014 | Kundu et al. |
| 8,712,970 B1 | 4/2014 | Sim-Tang |
| 8,719,362 B2 | 5/2014 | Wu et al. |
| 8,725,934 B2 | 5/2014 | Batwara et al. |
| 8,805,810 B2 | 8/2014 | Lucas |
| 8,818,954 B1 | 8/2014 | Bergant et al. |
| 8,825,938 B1 | 9/2014 | Ellard et al. |
| 8,892,938 B1 | 11/2014 | Sundaram et al. |
| 9,183,200 B1 | 11/2015 | Liu et al. |
| 9,235,606 B1 | 1/2016 | Mooney et al. |
| 9,507,843 B1* | 11/2016 | Madhavarapu ....... G06F 3/0619 |
| 9,552,382 B2 | 1/2017 | Barrus |
| 9,558,078 B2 | 1/2017 | Farlee et al. |
| 9,703,640 B2 | 7/2017 | Beatty et al. |
| 9,720,620 B1 | 8/2017 | Wei et al. |
| 9,720,991 B2 | 8/2017 | Kritchko et al. |
| 9,785,510 B1 | 10/2017 | Madhavarapu et al. |
| 10,162,715 B1 | 12/2018 | MacDonald McAlister et al. |
| 2002/0007363 A1* | 1/2002 | Vaitzblit ............. G06F 11/1471 |
| 2002/0114341 A1 | 8/2002 | Sutherland et al. |
| 2002/0152299 A1 | 10/2002 | Traversat et al. |
| 2003/0220935 A1 | 11/2003 | Vivian et al. |
| 2004/0215803 A1 | 10/2004 | Traversat et al. |
| 2005/0022213 A1 | 1/2005 | Yamagami |
| 2005/0188256 A1 | 8/2005 | Stager et al. |
| 2005/0251540 A1 | 11/2005 | Sim-Tang |
| 2006/0020634 A1 | 1/2006 | Huras et al. |
| 2006/0053262 A1 | 3/2006 | Prahlad et al. |
| 2006/0100972 A1 | 5/2006 | Chianese et al. |
| 2006/0253600 A1 | 11/2006 | Hannuksela |
| 2007/0027937 A1 | 2/2007 | McGrattan et al. |
| 2007/0028853 A1 | 2/2007 | Boyd |
| 2007/0162516 A1 | 7/2007 | Thiel et al. |
| 2007/0250835 A1 | 10/2007 | Kobayashi et al. |
| 2007/0276884 A1 | 11/2007 | Hara et al. |
| 2007/0288530 A1 | 12/2007 | Romem et al. |
| 2008/0294696 A1 | 11/2008 | Frandzel |
| 2009/0125362 A1 | 5/2009 | Reid et al. |
| 2009/0238262 A1 | 9/2009 | Miceli |
| 2009/0271605 A1 | 10/2009 | Park et al. |
| 2010/0005259 A1 | 1/2010 | Prahlad et al. |
| 2010/0257138 A1 | 10/2010 | Wang et al. |
| 2010/0257140 A1 | 10/2010 | Davis et al. |
| 2010/0262717 A1 | 10/2010 | Critchley et al. |
| 2010/0274762 A1 | 10/2010 | Murphy et al. |
| 2011/0141882 A1 | 6/2011 | Rieschl et al. |
| 2011/0178985 A1 | 7/2011 | San Martin Arribas et al. |
| 2011/0258239 A1 | 10/2011 | Petrocelli |
| 2012/0166401 A1 | 6/2012 | Li et al. |
| 2012/0209817 A1 | 8/2012 | Golab et al. |
| 2012/0221715 A1 | 8/2012 | Hamada |
| 2012/0250682 A1 | 10/2012 | Vincent et al. |
| 2012/0265890 A1 | 10/2012 | Carlson et al. |
| 2012/0303999 A1 | 11/2012 | Calder et al. |
| 2012/0317274 A1 | 12/2012 | Richter et al. |
| 2012/0317583 A1 | 12/2012 | Corbea et al. |
| 2013/0018853 A1 | 1/2013 | Jayaraman et al. |
| 2013/0073724 A1 | 3/2013 | Parashar et al. |
| 2013/0124466 A1 | 5/2013 | Naidu et al. |
| 2013/0124483 A1 | 5/2013 | Furuhashi et al. |
| 2013/0132604 A1 | 5/2013 | Cohen et al. |
| 2013/0151683 A1 | 6/2013 | Jain et al. |
| 2013/0152047 A1 | 6/2013 | Moorthi et al. |
| 2013/0166556 A1 | 6/2013 | Baeumges et al. |
| 2013/0262388 A1 | 10/2013 | Sorenson et al. |
| 2013/0290642 A1 | 10/2013 | Huang et al. |
| 2013/0346366 A1 | 12/2013 | Ananthanarayanan et al. |
| 2014/0019413 A1 | 1/2014 | Braam et al. |
| 2014/0019421 A1 | 1/2014 | Jagadeesan |
| 2014/0046906 A1 | 2/2014 | Patiejunas et al. |
| 2014/0047263 A1 | 2/2014 | Coatney et al. |
| 2014/0279905 A1 | 9/2014 | Muniswamy-Reddy et al. |
| 2014/0324785 A1 | 10/2014 | Gupta et al. |
| 2014/0358844 A1 | 12/2014 | Mundlapudi et al. |
| 2015/0172412 A1 | 6/2015 | Escriva et al. |
| 2016/0077744 A1 | 3/2016 | Pundir et al. |
| 2016/0077923 A1 | 3/2016 | Zhang et al. |
| 2018/0285400 A1* | 10/2018 | Chang ................. G06F 16/2272 |

OTHER PUBLICATIONS

Amazon Web Services, "Amazon DynamoDB Streams API Reference", API Version, Aug. 10, 2012, pp. 1-29.

U.S. Appl. No. 14/077,173, filed Nov. 11, 2013, Marvin Michael Theimer et al.

U.S. Appl. No. 14/077,171, filed Nov. 11, 2013, Marvin Michael Theimer et al.

U.S. Appl. No. 14/136,624, filed Dec. 20, 2013, Marvin Michael Theimer et al.

U.S. Appl. No. 14/136,645, filed Dec. 20, 2013, Marvin Michael Theimer et al.

U.S. Appl. No. 14/077,167, filed Nov. 11, 2013, Marvin Michael Theimer et al.

U.S. Appl. No. 14/077,162, filed Nov. 11, 2013, Marvin Michael Theimer et al.

(56) References Cited

OTHER PUBLICATIONS

U.S. Appl. No. 14/316,674, filed Jun. 26, 2014, Allan Henry Vermeulen et al.
U.S. Appl. No. 14/537,788, filed Nov. 10, 2014, Lei Ye et al.
International Search Report and Written Opinion From PCT/US2014/065057, dated Feb. 20, 2015, Amazon Technologies, Inc., pp. 1-13.
Alejandro Abdelnur, "Oozie Specification, a Hadoop Workflow System," Oct. 8, 2010, retrieved from http://rvs.github.com/oozie/release/2.2.1/WorkflowFunctionalSpec.html on Feb. 11, 2013, pp. 1-37.
Ani I Pillai and Alejandro Abdelnur, "Oozie Coordinator Specification," Oct. 8, 2010., retrieved from http://rvs.github.com/oozie/releases/2.2.1 /CoordinatorFunctionaiSpec.html on Feb. 11, 2013. pp. 1-43.
"Oozie—Design," retrieved from http://rvs.github.com/oozie/design.html on Feb. 11, 2013. pp. 1-2.
"Quartz Scheduler 2.1.x Documentation," retrieved from http://quartz-scheduler.org/files/documentation/Quartz-2.1.x-Documentation.pdfon Feb. 11, 2013. pp. 1-140.
Apache Kafka, "A High-Throughput Distributed Messaging System", pp. 1-42, Oct. 8, 2013.
Amazon Web Services, "Amazon Simple Queue Service (Amazon SQS)", pp. 1-5, Oct. 8, 2013.
Apache Software Foundation, "Hadoop Streaming", pp. 7-17, 2008.
Sigmod Record, "Parallel Data Processing with MapReduce: A Survey", Kyong-Ha Lee, et al., pp. 11-20, Dec. 2011.
Splunk Inc., "Splunk for Application Management", pp. 1-2, 2012.
GitHub, "Rationale", pp. 1-2, Oct. 8, 2011.
GitHub, "Tutorial", pp. 1-8, Oct. 8, 2013.
U.S. Appl. No. 13/764,716, filed Feb. 11, 2013, Kathryn Marie Shih et al.
U.S. Appl. No. 13/764,711, filed Feb. 11, 2013, Kathryn Marie Shih et al.
U.S. Appl. No. 61/738,967, filed Dec. 18, 2012, Kathryn Marie Shih et al.
U.S. Appl. No. 13/465,944, filed May 7, 2012, Jonathan 8. Corley et al.
U.S. Appl. No. 13/465,978, filed May 7, 2012, Jonathan 8. Corley et al.
U.S. Appl. No. 13/476,987, filed May 21, 2012, Jacob Gabrielson et al.
Pierre Dorion, IBM Tivoli Storage Manager backup software tips, Apr. 2009, http://searchdatabackup.techtarget.com/tip/IBMTivoli-Storage-Manager-backup-software-tips.
Lascon, TSM Hints and Tips on Restores, Nov. 10, 2012, LasCon Storage, http://www.lascon.co.uk/tsm-restores.php.
International Search Report and Written Opinion from PCT/US14/65052, dated Feb. 20, 2015, Amazon Technologies, Inc., pp. 1-11.
U.S. Appl. No. 14/753,475, filed Jun. 29, 2015, Allan Henry Vermeulen, et al.
U.S. Appl. No. 14/753,484, filed Jun. 29, 2015, John Michael Morkel, et al.
U.S. Appl. No. 14/753,495, filed Jun. 29, 2015, Timothy Daniel Cole, et al.
U.S. Appl. No. 14/753,505, filed Jun. 29, 2015, Allan Henry Vermeulen, et al.
U.S. Appl. No. 14/482,668, filed Sep. 10, 2014, Allan Henry Vermuelen.
U.S. Appl. No. 14/482,661, filed Sep. 10, 2014, Allan Henry Vermeulen.
U.S. Appl. No. 14/491,454, filed Sep. 19, 2014, Allan Henry Vermeulen.
U.S. Appl. No. 14/491,371, filed Sep. 19, 2014, Allan Henry Vermeulen.
U.S. Appl. No. 14/491,444, filed Sep. 19, 2014, Allan Henry Vermeulen.
U.S. Appl. No. 14/316,630, filed Jun. 26, 2014, Allan Henry Vermeulen.
U.S. Appl. No. 14/316,622, filed Jun. 26, 2014, Allan Henry Vermeulen.
U.S. Appl. No. 14/316,619, filed Jun. 26, 2014, Allan Henry Vermeulen.
U.S. Appl. No. 14/231,077, filed Mar. 31, 2014, Jacob A. Strauss.
U.S. Appl. No. 14/230,378, filed Mar. 31, 2011, Jacob A. Strauss.
Sergio Almeida, et al., "Chain Replication: a Causal + Consistent Datastore based on Chain Replication", Apr. 15-17, 2013, pp. 85-98.
Scott Lystig Fritchie, "Chain Replication in Theory and in Practice", Sep. 30, 2010, pp. 1-11.
Robbert Van Renesse, et al., "Chain Replication for Supporting High Throughput and Availability", 2004, pp. 91-104.
U.S. Appl. No. 15/717,614, filed Sep. 27, 2017, Vaibhav Jain.
U.S. Appl. No. 15/717,606, filed Sep. 27, 2017, Vaibhav Jain.
"Capturing Table Activity with DynamoDB Streams", dated Oct. 19, 2018, pp. 1-8.
Randall Hunt "New—Amazon DynamoDB Continuous Backups and Points-In-Time Recpvery", Mar. 26, 2018, pp. 1-9.
"Appendix E. Realese Notes", (PostgreSQL: Documentation: 10: E.144. Release 9.0.7), Oct. 19, 2018, pp. 1-4.
"PostgreSQL: THe World's Most Advanced Open Source Relational Database", (https://www.postgresql.org), dated Oct. 19, 2018, pp. 1-10.
"Cloud Spanner: TrueTime and External Consistency", Retrieved from URL: https://cloud.google.com/spanner/docs/true-time-external-consistency on Feb. 28, 2018, pp. 1-6.
Randall Hunt, "Keeping Time with Amazon Time Sync Service", AWS News Blog, Retrieved the URL: https://aws.amazon.com/blogs/aws/keeping-time-with-amazon-time-sync-service on Feb. 28, 2018, pp. 1-3.
Barbara Liskov, "Practical Uses of Synchronized Clocks in Distributed Systems", ACM, copyright 1991 ACM, pp. 1-9.
James C. Corbrett, et al., "Spanner: Google's Globally-Distributed Database", Published in the Proceeding of OSDI 2012, 2012, pp. 1-14.
Friedemann Mattern, "Virtual Time and Global States of Distributed Systems", in the Proceedings of the International Workshop on Parallel and Distributed Algorithms, Oct. 1988, pp. 120-134.
U.S. Appl. No. 15/918,920, filed Mar. 12, 2018, Tate Andrew Certain, et al.
U.S. Appl. No. 16/231,109, filed Dec. 21, 2018, Grant Alexander MacDonald McAlister.
U.S. Appl. No. 16/197,033, filed Nov. 20, 2018, Rachit Jain.
U.S. Appl. No. 15/920,193, filed Mar. 13, 2018, Akshat Vig.
U.S. Appl. No. 16/101,153, filed Aug. 10, 2018, Akshat Vig.
U.S. Appl. No. 14/977,472, filed Dec. 21, 2015, Akshat Vig.
U.S. Appl. No. 15/676,933, filed Aug. 14, 2017, Elizabeth Sanocki.
U.S. Appl. No. 15/728,271, filed Oct. 9, 2017, Pradeep Jnana Madhavarapu.
U.S. Appl. No. 14/977,453, filed Dec. 21, 2015, Yan Valerie Leshinsky.
U.S. Appl. No. 15/807,367, filed Nov. 8, 2017, Vaibhav Jain.
U.S. Appl. No. 15/920,207, filed Mar. 13, 2018, Akshat Vig.

* cited by examiner

RESTORATION OF A DATA SOURCE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

For example, a data store such as a database system managing large amounts of data on behalf of users may distribute and/or replicate that data across two or more machines, often in different locations, for any of a number of reasons, including security issues, disaster prevention and recovery issues, data locality and availability issues, etc. These machines may be configured in a number of ways, including as a shared resource pool. For example, a database table may be split into two or more partitions, each of which may be replicated, and each replica may be stored on a different machine. Interaction between client applications and database servers typically includes read operations (read-only queries), write operations (to store data), and update operations that can be conceptualized using a read-modify-write workflow.

Clients with large-scale data stores (e.g., such as large-scale databases) may create proprietary backup solutions that scan data from a data store into scalable, durable storage, but these solutions suffer from a number of problems such as taking too much time to perform the backup, interrupting a customer's regular workflow, tying up resources (e.g., scan-based solutions can compete with production workloads for read throughput), and providing only limited options for restoring from static backups (e.g., periods of time between backups may be too long). Additionally, getting a consistent backup across a large number of storage nodes can be hard to do without the customer stopping all writes. Scan-based solutions can be expensive (e.g., a scan backup of a 100 TB table, etc.) both in compute costs and storage costs and may not provide a managed experience (e.g., a managed experience where customers can view characteristics of the backups, manage the backups, etc.).

Some systems perform timed, periodic backups by scanning the data store to create a copy of the data store. But, the period of time in-between backups of a periodic system may be of a length that prohibits restoring the data store to a particular point-in-time of interest (e.g., if the point-in-time of interest falls in-between to backups).

Some database systems require backup of the entire table (e.g., all partitions are backed-up at once, as a coherent whole). Generally, database systems require obtaining a copy of the entire authoritative database in order to generate the next full backup snapshot.

Additionally, even if backups are generated, none of the NoSQL database systems restore data from a backup copy to a corrupted live NoSQL production database table and NoSQL database systems generate change logs suitable for restoration of corrupt data.

Figure 1:
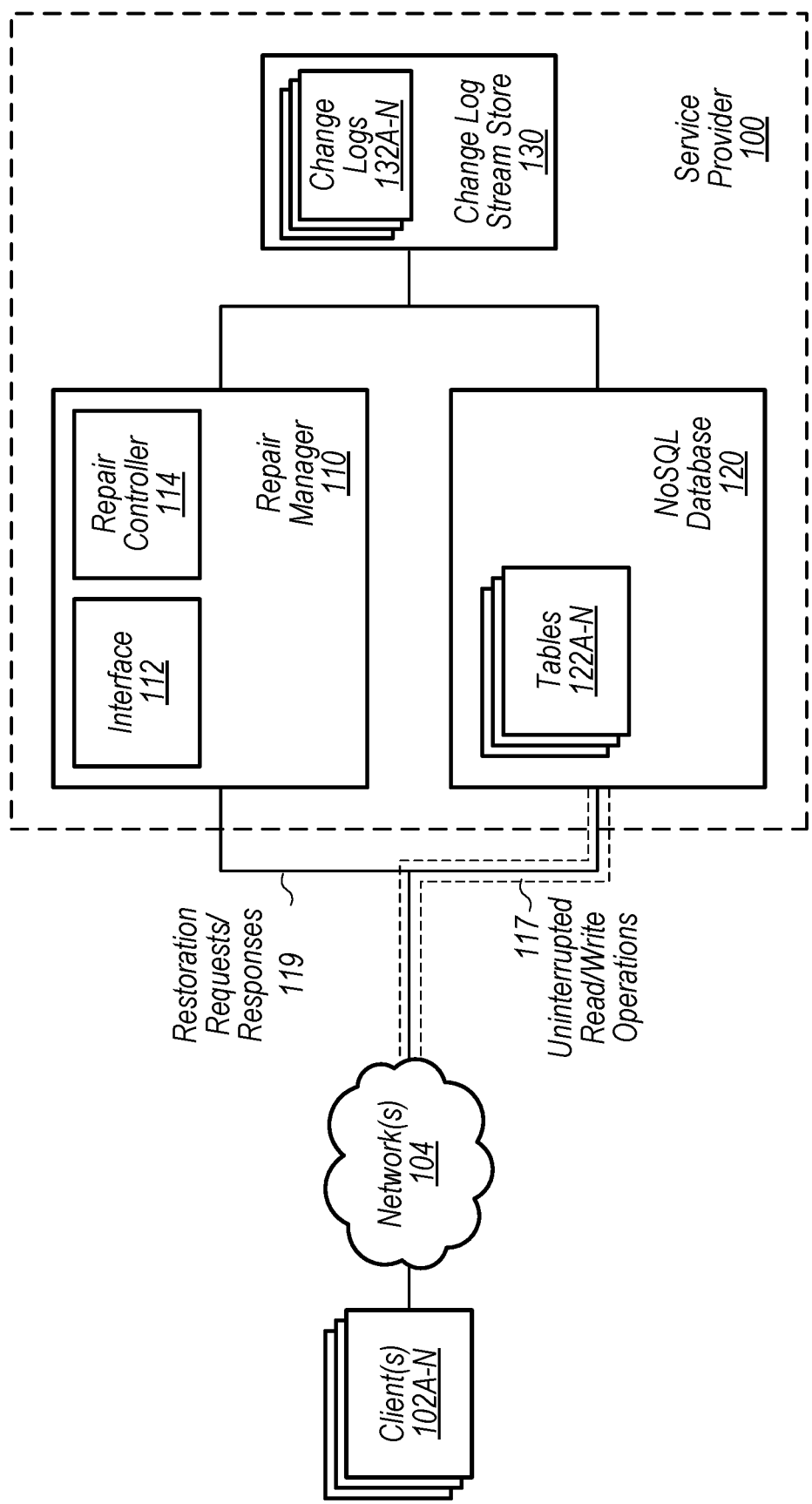
FIG. 1 is a block diagram illustrating logical relationships between components of a system for restoration of a NoSQL data source, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" be used in a permissive sense (i.e., meaning having the potential to), rather than the mandatory sense (i.e., meaning must). Similarly, the words "include", "including", and "includes" mean including, but not limited to.

DETAILED DESCRIPTION

Introduction

In various circumstances, such as in the case of corrupted data, missing entries, or in the case of a system outage, etc., it may be useful to restore data to a data store. Corrupted data may occur for any of various reasons, such as a bad code push, improper encryption of variables, or execution of faulty scripts, as just a few examples of many more. In some instance, it may be preferable to restore data to the data store while that data store is actively receiving data traffic, such as restoring corrupted entries in a production NoSQL database that continues to accept read and write operations from clients while the restoration is performed, for example, although other particular types of data stores are also contemplated.

Database systems do not provide customers with a way to restore corrupt data in an active production table, certainly not on an item-by-item basis as described herein. For example, undo logs of relational database systems are used to undo failed individual transactions, not restore corrupt data. Additionally, the dependencies among the indexes for items in a relational database system prevent restoration of corrupt data on an element-by-element basis. For instance, for a RDBMS, if a database crashes, the recovery process has to apply all transactions, both uncommitted as well as committed, to the data-files on disk, using the information in the redo log files.

Disclosed are systems, processes and program instructions for restoration of an active data source, while the data store is available to receive traffic (e.g., a live relational database; a key, value object store; a live production NoSQL table that continues to accept read and write operations; etc.). While it may be possible to create a restored secondary table based upon a backup copy or snapshot (necessarily reflective of a point in time prior to the corruption), and then point the processes using the production table away from the production table and to the secondary table, such a switching scheme has pitfalls at least because the production table may still have corrupted data or missing entries, etc., and furthermore, there is no mechanism to replay the good entries from the restored secondary table to the production table, not while the production database that is actively receiving traffic, anyway.

Additionally, such a use of the restored secondary table ultimately includes some amount of data loss, such as loss of the valid changes to the database that happened subsequent to the time of the generated secondary table, and/or loss of valid changes (e.g., live customer traffic) to the database that happened subsequent to the time of corruption. Additionally, at least some amount of inaccessibility is associated with the above-described database table switching scheme (e.g., reestablishment of connections, etc., may prevent writes to a live table).

In an example of the deficiency of the switching scheme, it may not be unusual for a customer to overlook or not become aware of a data corruption for hours or days or even longer after the corruption happens. Because the switching-to-a-restored-secondary-table scheme necessarily requires generating a backup table at a time prior to the corruption, such a scheme may result in hours, days or longer periods of time-worth of lost valid data changes associated with live customer traffic. Techniques described herein may minimize or even eliminate data loss while correcting corruptions in a live data source. For example, the restoration of data to a live NoSQL database table, as described in embodiments herein, can correct the corrupted data, and also keep the live production table up-to-date for the live customer traffic that affected the live production table after the corruption event, unlike other techniques for restoring database tables.

As disclosed herein, various embodiments describe a technique for restoration of an active data source. In embodiments, the system implements an interface (e.g., an application program interface (API) or GUI, or other interface) that receives specification of certain filter conditions from a client. The filter conditions may be used to discover corruptions to the data store. In an example, a NoSQL database table may experience a loss or corruption of data (e.g., for a period of time, and/or associated with data having a particular characteristic—such as data for a particular client, customer, etc.). In embodiments, a restoration process may process a log of transactions for the NoSQL database table that occurred during the period of time and revert all the changes that happened during that period of time. In embodiments, the filter conditions may be applied to entries in the change log to determine which entries are corrupt and should be corrected while leaving other entries not identified as corrupt. In some embodiments, the restoration process may process the log of transactions that occurred during the period of time and revert the corrupt changes that happened during that period of time while giving preference to manual corrections that customers had already made. The manual corrections may be determined via application of the filter conditions, for example (e.g., source IP address or userID associated with change). Filter "conditions" and filter "criteria" may be used herein to indicate similar features of the disclosed invention.

In some instances, the corrupt data may be discovered and identified by a manual process performed by a customer (e.g., administrative personnel) of the service provider. In embodiments, an automated corrupt data discovery process may include application of filter conditions to items in a change log stream to identify that data in the data store has been corrupted. For example, system alarms based on the filter conditions may identify corrupt data. In one particular example, an application that uses data and that stops working due to corruption of the data might send an error that identifies the corruption.

In some instances, the time window may be determined by an automated corruption discovery process. For example, a corruption discovery process may apply filter conditions, such as those described herein to the change logs in a process that is synchronous (in real-time with the changes being published) or asynchronous (e.g., periodically) with the publishing of the changes by the change log stream service. Corrupt data discovered by the filter conditions may trigger a start of a time window. An end of discovery of the corrupt data may indicate an end of the time window. A corrupt data alert may be initiated and/or sent to the client, in some embodiments. In some instances, the process for restoration of a data source may be automatically triggered by the discovery process.

The filter conditions may operate on any of the table columns and may have additional variable (e.g., outside table columns) such as IP address, region, time, etc. (a non-exhaustive list). Then, for example, a repair process may include iterating over the stream of changes made to the data store and, for a change that satisfies one or more of the above-noted conditions, a correct entry may be pulled from the restored secondary table (or from the change log, in some embodiments) and made as a change to the active data store.

In some embodiments described herein, a repair manager provides an interface for the system to receive a time window (e.g., entered by an administrator of a client, the service provider, or determined otherwise, such as via an automated corruption discovery process, described below) during which items in a data store were corrupted. Filter conditions, used to identify corrupt entries, may also be received via an interface. A non-exhaustive list of example filter conditions includes a data value or data value range for one or more attributes of items in the data store, a data type for one or more attributes of items in the data store, or a metadata value for items in the data store. An example metadata value may specify a source identifier (e.g., an internet protocol (IP) address, a user identifier, account identifier) or location identifier for an item change.

To identify corrupt entries in the data store, the repair manager may examine items in a portion of a change log for the data store (e.g., the portion of the change log may indicate changes made to items in the data store during the time window). Examination of the items from the change log may include the repair manager applying filter conditions to each item, or to metadata for each item, to identify individual items that are corrupted. In embodiments, the repair manager may determine a repair operation for each individual item identified to be corrupted and instruct or perform the repair operation to the data store while the data store continues to accept read and write operations from one or more clients of the data store.

Determination of Repair Operation

Figure 5:
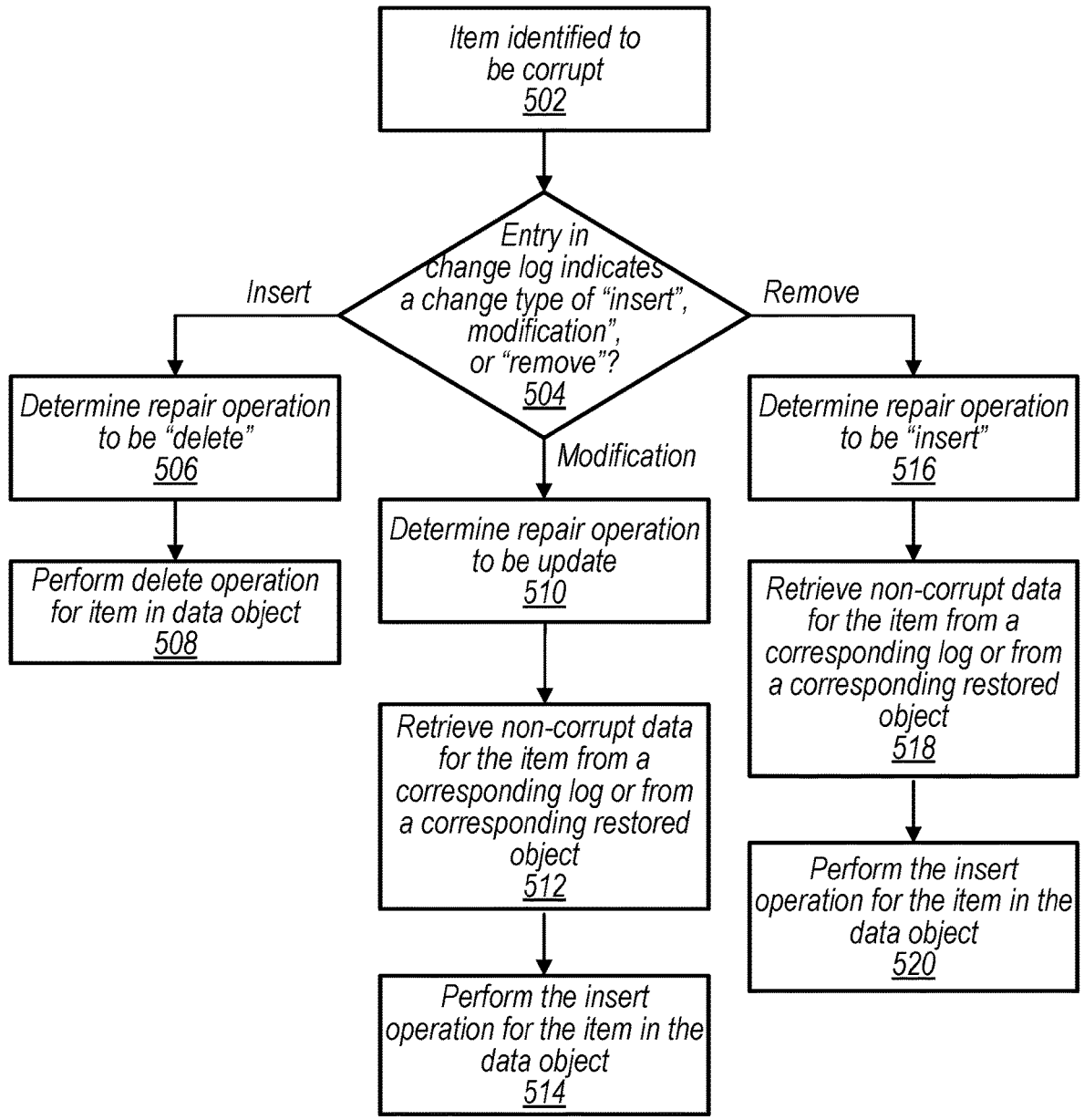
FIG. 5 is an example technique of determining repair operations for restoration of an active NoSQL database table, according to some embodiments.

In embodiments, the repair manager may determine a change type and corresponding repair operation (e.g., insert, modification, remove) from an entry of the change log for the item (e.g., as illustrated in FIG. 5, described below). For example, some data logging systems or services may report both the before and after images for a changed item. In an embodiment, the repair manager may determine, based on the entry in the change log that indicates the change type is an item insert, the repair operation to be a delete of the item from the data store. Similar logic may be applied to other operations. For example, the repair manager may, in response to a determination that the change type is an item modification, determine the repair operation to be an update of the item in the data store. In another example, the repair manager may, in response to a determination that the change type for the entry in the change log is an item remove, determine the repair operation to be an insert to the item in the data store.

Source of Data for Repair Operation

The data used to repair the corruption may be come from any of various sources. For example, in systems that generate change logs for changes to objects in data stores and report both before and after images of the entry in the change log, the data used to correct the corruption may come from the change log (e.g., illustrated in FIG. 1, described below) for the corresponding object in the data store. In some instances, for corruptions that repeatedly affected the same entry, the repair manager may use the filter conditions to identify which one of the multiple changes to an entry was the most recent valid entry. For example, a filter criterion based on a particular data type for an entry may eliminate a number of modifications for the same item that were of the incorrect data type and perform a single restoration with the non-corrupt entry that is of the correct data type.

In data storage systems that create backup copies of the data store (e.g., archival snapshots of objects such as tables, etc.) the snapshots may act as a source for the data used to correct the item entries (e.g., illustrated in FIG. 3A, described below).

The repair manager may perform the repairs based on the change type. For example, the repair manager may, in response to a determination that the repair operation is an update operation, determine non-corrupt data from the change log for the item that is valid prior to the time window. In at least some such cases, the repair manager may perform the update operation to the data store to update the item in the data store with the determined data. Other examples based on similar logic apply without departing from the scope of the disclosure. For example, the repair manager may, in response to a determination that the repair operation is an insert operation, determine data for the item that is valid prior the time window from the change log. The repair manager may perform the insert operation to the data store to insert the item in the data store with the determined valid data.

In an example where a restored copy of the data object acts as a source of the non-corrupt data, the repair manager may request creation of a restored copy of the data object restored at a time immediately prior to the time window. In response to a determination that the repair operation is an update operation, the repair manager may determine a value or other data for the item that is valid prior the time window from the restored copy of the data object. The repair manager may perform the update operation to the data store to update the item in the data store with the determined data. Similar logic for other operations are applicable. For example, for an insert operation, the repair manager may request the creation of the restored copy, and use the data for the item from the restored copy that is valid prior to the time window to correct the corrupt data.

In various embodiments, a data object may be repaired with or without using the filter criteria. For example, using a NoSQL database table as one example of many types of data objects, the system may determine a time window during which one or more items in a NoSQL database table were corrupted (e.g., determine via receipt of the time window via an interface) and select a corresponding portion of a change log for the NoSQL database table. The corresponding portion of the change log may indicate changes made to items in the NoSQL database table during the time window. For individual items from the portion of the change log the repair manager may determine a repair operation for the individual item, and perform the repair operation to the NoSQL database table while the NoSQL database table continues to accept read and write operations from one or more clients of the NoSQL database table.

An Example Source of Data for Restorations: A Data Protection System

As described herein, a system may perform a technique of restoration that restores corrupt entries in a data object while leaving or retaining entries that were changed after the corruption happened. Such a technique is an improvement or prior systems at least because, as described in the introduction, above, data loss is minimized if not eliminated altogether. In embodiments, the technique performs restoration at an item-level granularity, instead of rolling back all the changes regardless of whether the changes caused data corruption or not. A data protection system, like that described below, may act as a source for the non-corrupt data, in embodiments.

In embodiments, a data protection system captures all of the changes happening on the data store (e.g., a database) and periodically builds system snapshots (sometimes referred to as copies, herein) by applying logs on the closest system snapshot.

For example, the system may be able to apply transaction logs to a previous logical backup to create a new point-in-time logical backup, without losing any customer data, in some instances. For example, system snapshots may be built at a partition level (e.g., for systems that partition data) by applying the change logs to prior snapshots. In some such embodiments, the data protection system generates backups without any additional queries or scanning of the client's production data store by relying on prior snapshots and change log data to create new snapshots, instead. Accumulation of change log data for a table, as well as generation of updates to snapshots for the table may be performed independently for each partition (e.g., at a different time) of a same table, based 15 on characteristics particular to each partition for example, in some embodiments.

Backup and Restore Via Log-Apply

In embodiments, a log apply service of the data protection system is responsible for at least two core functionalities to support backup and restore. During a conversion process, the log apply service may convert partition snapshots (sometimes referred to as backups) from a physical format (e.g., mysql) to a logical format snapshot. The log apply service may also create subsequent point-in-time logical partition snapshots by applying transaction logs to a previous logical partition snapshot, and create a complete user backup, for example.

In some embodiments, continuous capture of individual changes to a table provide for a more fine-grained availability of those individual changes at a later time. For example, the accumulation of individual changes to the data—data that constitutes a state of the database table at a time, in embodiments, may be used to more accurately take the table—or partition—back to a particular state at any point-in-time along a continuum. Such features contrast with prior systems that could only take the system back to a select few points-in-time when snapshots of the system were taken. In some such prior systems, the snapshots added additional burden to the client's production system because the snapshots were created from scans of the production database, interrupting or delaying production services. Additionally, scan-based snapshots take relatively more time to create, and fail to provide as accurate a view of the database as the techniques disclosed herein, at least because, by the time the scan completes (at least for large data sets), data that has already been scanned may have been changed.

Additionally, in at least some embodiments, the techniques described herein are applied on a partition-by-partition basis. For example, snapshots and change log data for a particular partition may be kept in an uncoordinated manner, with respect to the other partitions of the table (e.g., according to different schedules). A relatively inactive partition of a table may have a snapshot generated based on a maximum duration of time threshold, while another relatively active partition of that same table may have snapshots generated more often, based on an amount of accumulated changes, as just one example of many. The times at which the snapshots are created for either partition may not have any relationship, and may be based upon the particular characteristics of that partition, in embodiments.

The above-noted process may be triggered when a customer enables backups for a given table. In embodiments, the data protection manager 312 (illustrated in FIG. 3) may initiate the first complete backup of the table, during the initial backup process. For example, for all partitions of the table, the data protection manager or service may store the snapshots by exporting data from storage nodes to storage-level physical format into a durable storage.

In embodiments, a log apply process is used whenever the data protection manager or service decides a new logical partition snapshot is required to bound the time taken for creating point-in-time backups. Log apply may also be used during restore to apply logs to a backup.

In some systems, log applying backups is an expensive operation (e.g., when there is a relatively greater amount of time and greater number of changes between backups). By relying on pre-existing incremental partition images to define a backup, the system may significantly reduce the load on the log apply service, saving compute costs. Additionally, by relying upon incremental partition images to define a backup, the system may allow users to create many backups partially sharing the same set of logs and base partition images, which may translate into storage costs savings.

In some embodiments, a periodicity at which system snapshots of the partitions are built is decided based on an amount of logs accumulated. For example, the periodicity may be based on a threshold amount of logs accumulated. In another example, the periodicity may be based upon a rate of change of the logs accumulated. For instance, if the system is becoming more active more changes are being generated . . . the increase in the rate of change of the number of logs may be used as a trigger to increase the periodicity. In some embodiments, the log apply service applies logs for a single partition on a single host. In some circumstances (e.g., large tables) each partition may be log applied in parallel to reduce the time to apply the logs for the table, e.g., by respective parallel processes.

In embodiments, both the newly-created snapshots as well as the change logs are stored to durable storage. In some such embodiments, the snapshots and the durably-stored change logs may be used to restore the partition. In some embodiments, the continuous data protection backup service provides an interface and functionality supporting unified management of the data, while optimizing customer costs and restore times via periodic log application and trimming.

Another benefit of some embodiments is a predictable time to recovery, by accurately identifying continuous backups, which, if restored, would cause the system to break SLAs and take appropriate action to bring the system back into compliance.

The systems and methods described herein may be employed in various combinations and in various embodiments to implement a network-based service that provides data storage services to storage service clients (e.g., user, subscribers, or client applications that access the data storage service on behalf of users or subscribers). The service may, in some embodiments, support data protection of tables that are maintained on behalf of clients in a data store, e.g., a non-relational database or other type of database. The service may provide a high level of durability and availability through replication, in some embodiments. For example, in some embodiments, the data storage service may store data in multiple partitions (e.g., partitions that each contain a subset of the data in a table being maintained on behalf of a client), and may store multiple replicas of those partitions on respective storage devices or virtual storage volumes of different storage nodes.

In some embodiments, the data storage systems described herein may provide mechanisms for backing up a database table as a synchronous operation while the database continues to receive, accept, and service read and/or write operations that are directed to the table. In some embodiments, in response to a request to back up a table, the system may create a backup of each individual partition independently and (in some cases) in parallel (i.e., substantially concurrently). In embodiments, when a request to back up a table is received, the system may guarantee that all write operations that were directed to the table up to that point are included in the backup. In some embodiments, such a guarantee may not be made.

In some embodiments, backup operations may be initiated by data storage service users (e.g., customers, service subscriber, and/or client applications) using a "CreateBackup" application programming interface (API). In some embodiments, the systems described herein may support the scheduling of backups (e.g., every day at a particular time, or according to a published, but not necessarily periodic, schedule). In response to receiving a request to back up a table, these systems may back up each partition of the table as an individual item in a remote storage system (e.g., a key-value durable storage system), and may store metadata about the backup that is subsequently usable when restoring the backup to a new database (e.g., a new database table). In some embodiments, the system may be configured to initiate separate backup operations for each of the partitions of a table automatically (e.g., programmatically and without user intervention) in response to a request to back up the table, and to manage those backup operations on a per-partition basis (again, without user involvement).

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

Another API may allow consumers to update the current settings for a table within the database service, for example, to enable or disable the continuous backups and modify the duration of time to retain backups.

In various embodiments, the systems described herein may store data in replicated partitions on multiple storage nodes (which may be located in multiple data centers) and may implement a single master failover protocol. For example, each partition may be replicated on two or more storage nodes (or storage devices thereof) in a distributed database system, where those replicas make up a replica group. In some embodiments, membership in various replica groups may be adjusted through replicated changes, and membership and other updates in the system may be synchronized by synchronizing over a quorum of replicas in one or more data centers at failover time.

As described herein, when a database table is created or restored from backup, various resources may be provisioned for the implementation of that table, including storage resources (e.g., disk capacity), and throughput capacity (which may, e.g., be specified in terms of input/output requests per second, or IOPS, for read operations and/or write operations). If the table is divided into two or more partitions (e.g., if various data items are stored on different ones of the partitions according to their primary key values), the provisioned resources may also be divided among the partitions. For example, if a database table is divided into two partitions, each partition may have access to half of the total amount of storage and/or throughput resources that are provisioned and/or committed for the implementation of the table.

In some embodiments of the distributed database systems described herein, each storage node may include multiple storage devices or logical volumes, each of which stores various partition replicas. For example, in one embodiment, each storage node of the distributed database system may include five storage devices or logical storage volumes. In some embodiments, one or more mechanisms may be implemented on each of the storage nodes for determining, on a local level (e.g., on a storage node basis) whether and/or how to split a partition or move a partition (or a given replica of a partition), based on the current utilization of provisioned resources and/or other information. For example, one of the storage nodes may be configured to determine that a partition for which a replica is stored on one of its storage devices (e.g., disks) or logical storage volumes should be split into two new partitions, and may divide the data in the partition by hash ranges, by key space ranges, or using other criteria to divide the data between the two new partitions. In another example, a storage node may be configured to determine that one or more partitions (or replicas thereof) should be moved from a given storage device or logical storage volume to another storage device or logical storage volume, e.g., in order to reduce the amount of provisioned storage capacity or throughput capacity on the given storage device or logical storage volume.

As noted above, from a user's perspective, a backup operation generally operates to create a backup of a whole table, but internally, the system may back up each partition of the table independently, such that consistency is guaranteed only up to a particular transaction or write operation on a per partition basis (rather than across the whole table). In some embodiments, the system may be configured to maintain metadata about the table (e.g., to keep track of the table schema, and the state of the world from the perspective of the table and of each partition). In some embodiments, this metadata may be stored in the data storage system itself, and a copy of the metadata may also be stored in the remote storage system into which tables are backed up.

DETAILED DESCRIPTION OF FIGURES

Figure 2:
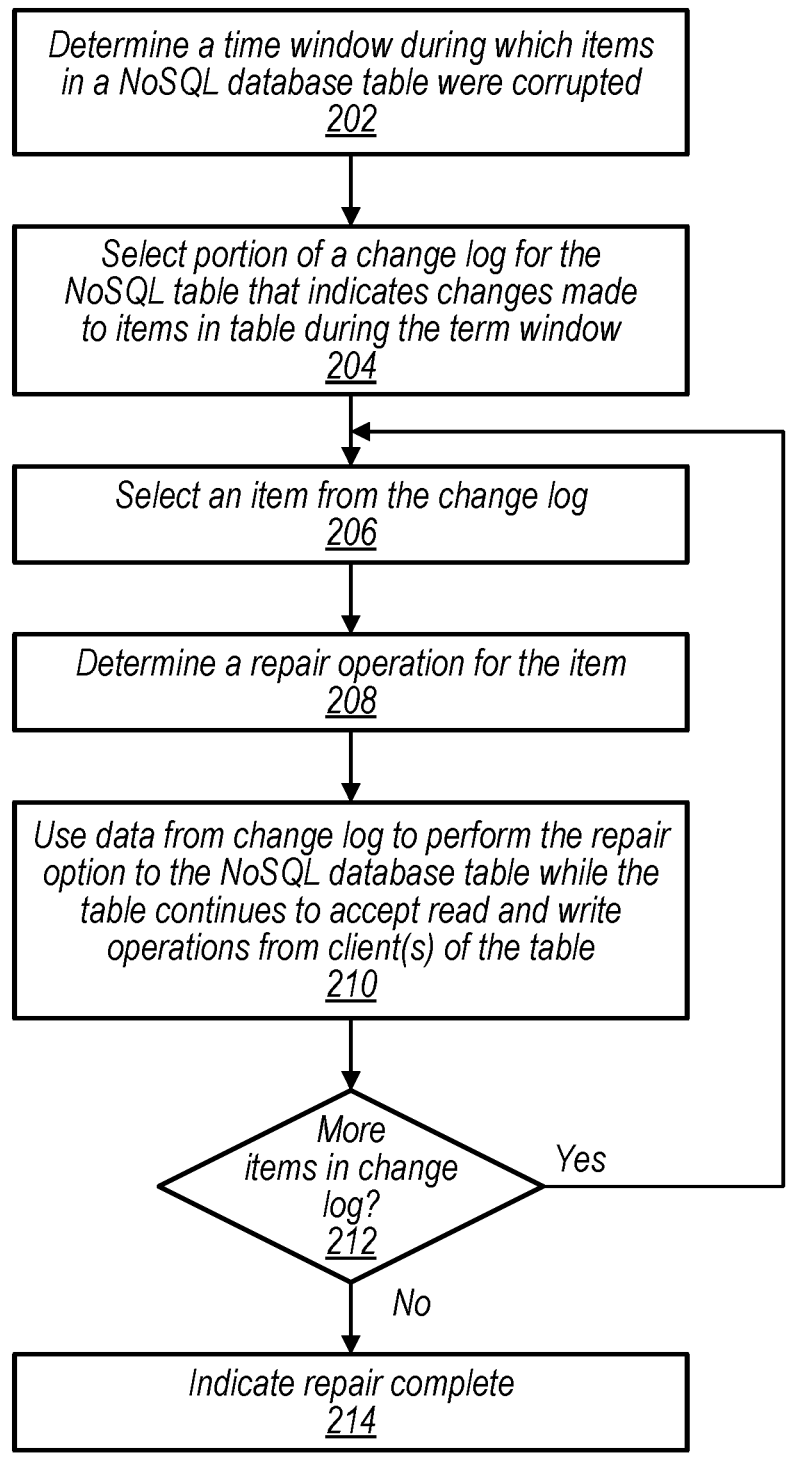
FIG. 2 is a process diagram illustrating a technique for performing restoration of a NoSQL database table, according to some embodiments.

FIG. 1 is a block diagram illustrating logical relationships between components of a system for restoration of a NoSQL database table, according to some embodiments. Techniques similar to those illustrated in at least FIGS. 2, 4A-B, and 5 may be performed by one or more components illustrated in FIG. 1, in embodiments. FIG. 2 is a process diagram illustrating a technique for performing restoration of a NoSQL database table, according to some embodiments. Features illustrated in FIG. 2 may be performed by components of the system illustrated in FIG. 1, in embodiments.

The system illustrated in FIG. 1 is a service provider 100 that provides services (e.g., a NoSQL database service) to clients 102A-N via one or more networks 104. FIG. 1 illustrates that NoSQL database 120 provides uninterrupted servicing of read/write operations 117 from clients 102A-N (e.g., read/write operations directed to tables 122A-N) while restoration requests, restoration processing and/or restoration responses 119 are handled by the repair manager 110. In the illustrated embodiment, client(s) 102A-N may include processes (internal or external to the service provider 100) operating on behalf of a customer of the service provider 100 that send read/write operations 117 to NoSQL database 120. In the illustrated embodiment, client(s) 102A-N also include an administrative client of the customer that makes requests of the repair manager via interface 112 (illustrated in FIG. 6, described below). In some embodiments, the restoration described herein may be performed on objects of the data store while the data store continues to receive read and write operations for those objects (e.g., an active or live, production data store that is available to receive or is actively receiving read and write operations.). For example, repair manager 110 may include a repair controller 114 that may perform the restoration using data from a change log of change logs 132A-N of change log stream store 130 to update an entry in the corresponding table in NoSQL database 120.

In at least the illustrated embodiment, the disclosed restoration technique illustrated in FIG. 2 relies upon data from a change log for the NoSQL database table as a source of data to use to correct corrupt entries in the table (other sources of correct data may be used, in embodiments). For instance, at block 202, a time window is determined during which items in a NoSQL database table were corrupted (e.g., a repair manager 110 may implement an interface 112 like that illustrated in FIG. 6, described below for receiving specification of the time window). At block 204, a portion of a change log (e.g., change log 132A) is selected for the NoSQL table (e.g., table 122A) that indicates changes made to items in the table during the time window. In embodiments, there may be a one-to-one relationship between objects of a data store and a respective change log for the data store. In some embodiments, a group of change logs (e.g., change logs of various dates) may include changed to items in the same data object. The repair manager 110 may select the portion of the change log (e.g., suitable for the time period) from a change log data stream store 130. The change log stream store may be implemented variously. For example, the change log stream store may be implemented as a feature or service of the data store (e.g., a data stream service of the data store that reports changes to objects in the data store), or may be implemented as a stand-alone data logging service, such as a data streaming service.

At block 206, an item may be selected from the change log, and at block 208 a repair option for the item is determined (by the repair manager 110, for example). An example technique for determining repair options is illustrated in FIG. 5, described below. Repair options may vary (e.g., delete, insert, update, etc.). At block 210, data from the change log stream store (e.g., 130) may be used to perform the repair option to the NoSQL database table while the table continues to accept read and wrote operations from one or more clients of the table, for example. Blocks 206, 208 and 210 may be repeated for each of the items in the change log. For example, if there are more items in the change log (block 212, yes) the process may return to block 206 and repeat. If all the items from the change log have been examined (block 212, no) an indication that the restoration is complete may be transmitted (block 214). For example, an indication that restoration is complete may be sent to the interface illustrated in FIG. 6, described below, or otherwise.

In some embodiments, the repair manager 110 includes a filter engine (not illustrated in FIG. 1). In embodiments, the filter engine may receive filter condition (e.g., via the interface 112, or otherwise) and may be apply the filter condition to items in the change log to identify which items in the corresponding data object are corrupt such that the repair controller can restore the corrupt item with non-corrupt data.

Figure 3:
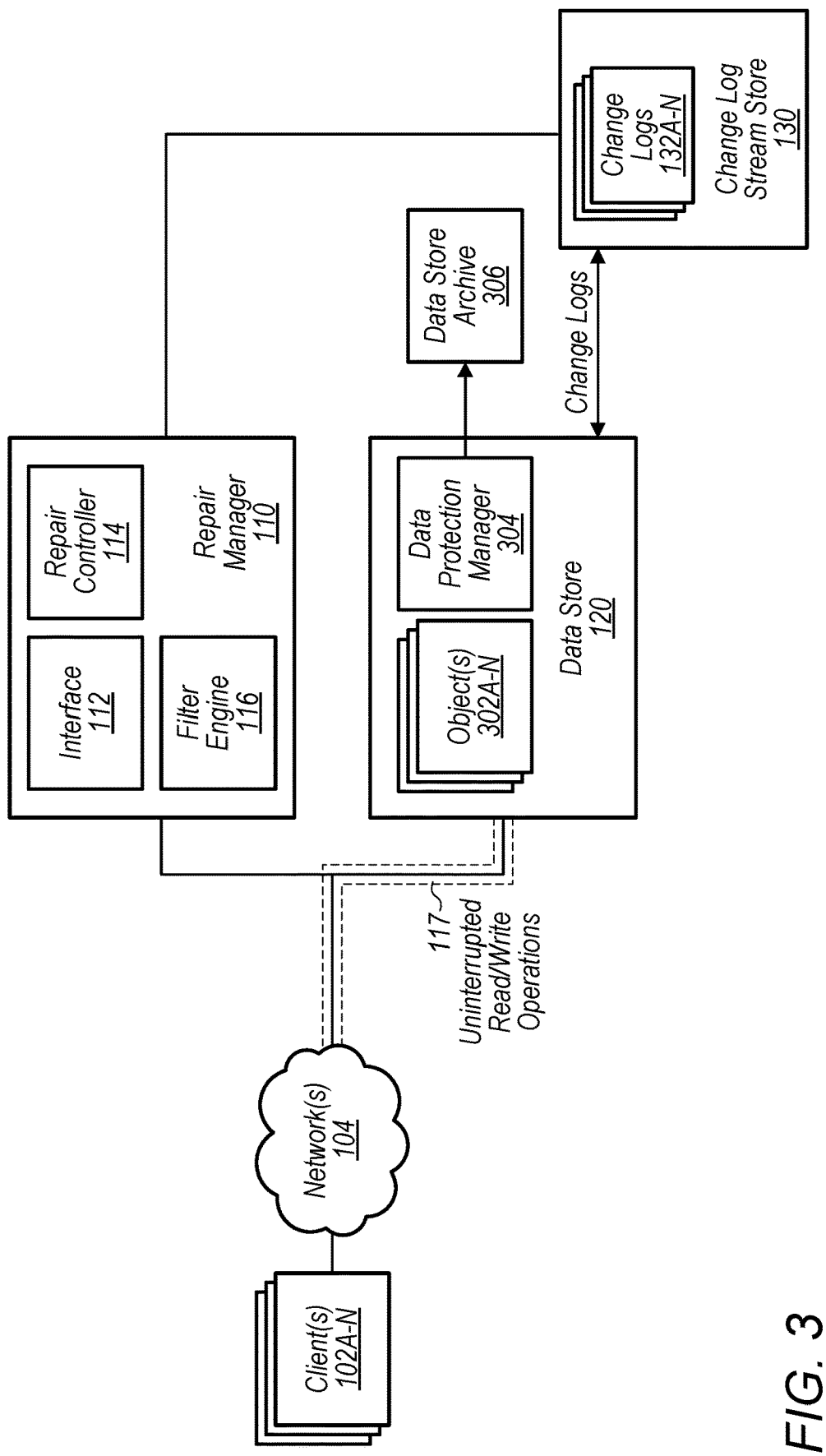
FIG. 3 is a data flow diagram illustrating data flows between components of a system for restoration of a data source, according to some embodiments.

FIG. 3 is a data flow diagram illustrating data flows between components of a system for restoration of a data source, according to some embodiments. The illustrated components may perform techniques like the techniques illustrated in FIGS. 4A-B, 5 and 6, in various embodiments.

In FIG. 3, a data store 120 stores objects 302A-N on behalf of clients 102A-N and a data protection manager 304 that may perform some of the techniques described above as part of the data protection system for protecting items in data objects 302A-N. For instance, data store 120 may produce change logs 132A-N that are stored at a change log stream store 302 and the data protection manager 304 may use the change logs 132A-N, in combination with archived copies of objects 302A-N stored in data store archive 306 to generate restored copies of the objects 302A-N (e.g., copies restored to a point-in-time just before a corruption event). The restored copies may serve as a source of non-corrupt data for the restoration processes described herein. Various parts of the restoration may be performed by components of the repair manager 110. For example, the interface 112 may receive an indication of the time window and/or the filter condition for the filter engine 116 to apply to the items in the change log, and the repair controller 114 may perform the repair portions of the restoration, in embodiments.

Various embodiments described herein are performed on an "active" or "live" data store. For example, an active data store may be a production data store that is actively engaged in receiving and processing requests (e.g., read and write requests). Some active data stores may be available to accept read and write requests, but may not be actively accepting read and write request simply because no requests are coming in, in embodiments. Some such data stores may still be considered live or active, in embodiments. Embodiments are contemplated where the restoration is performed on a data store that is not active. An inactive data store may not be available to accept read and write operations, for example.

Figure 4A:
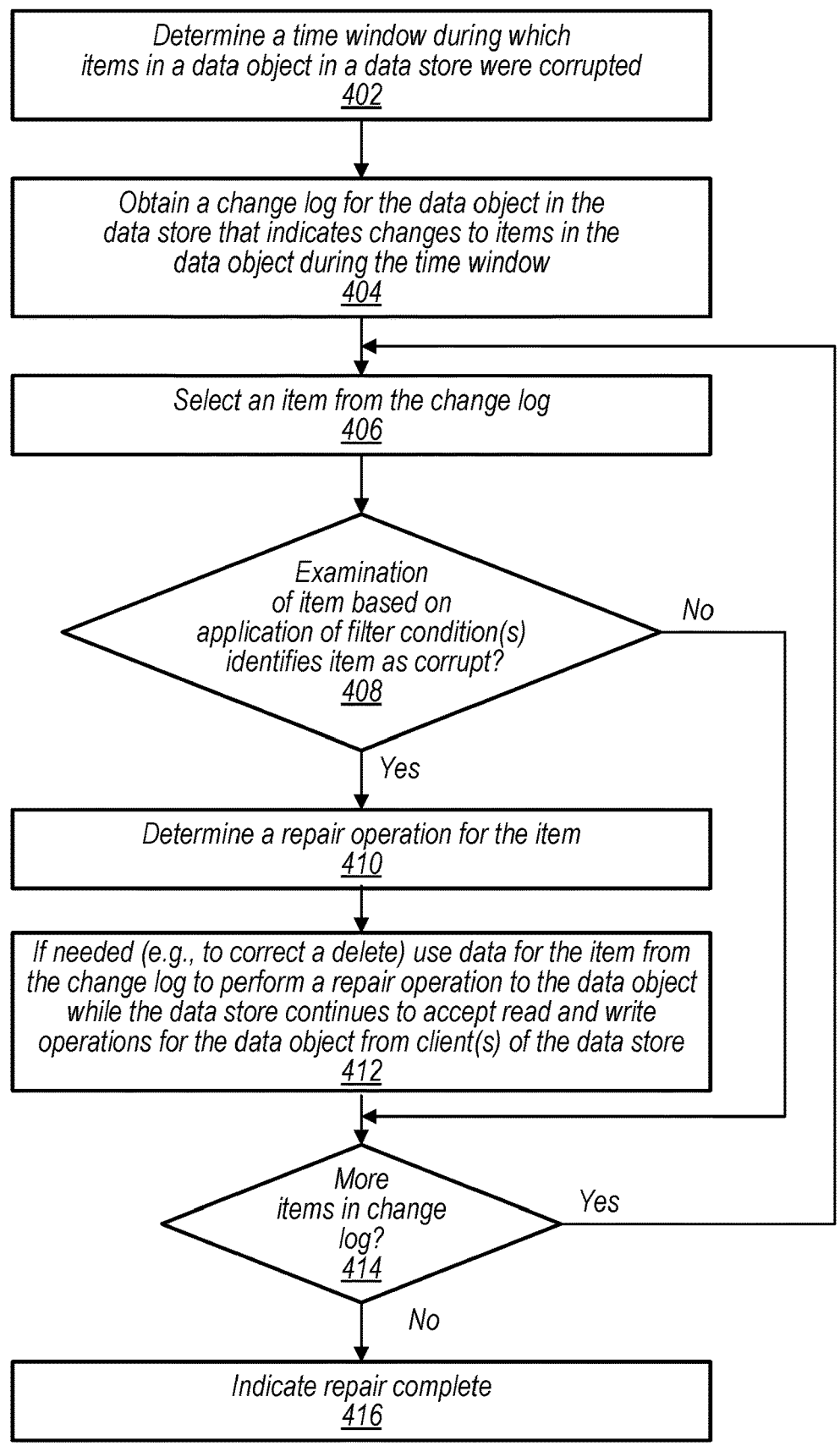
FIG. 4A is a flow chart illustrating a technique for restoration of a data source using data from a change log, according to some embodiments.
Figure 4B:
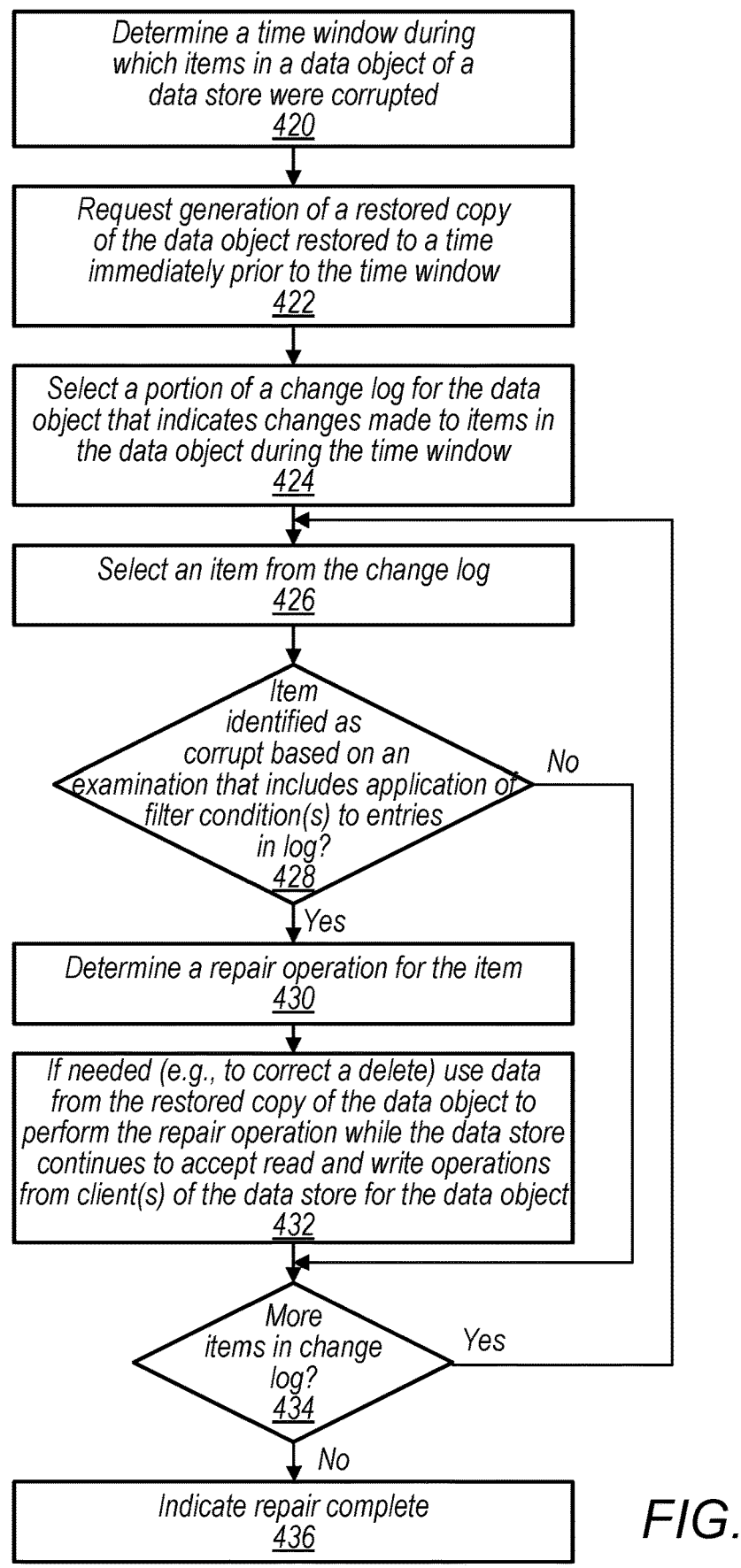
FIG. 4B is a flow chart illustrating a technique for restoration of a data source using data from a restored copy of the data store, according to some embodiments.
Figure 4C:
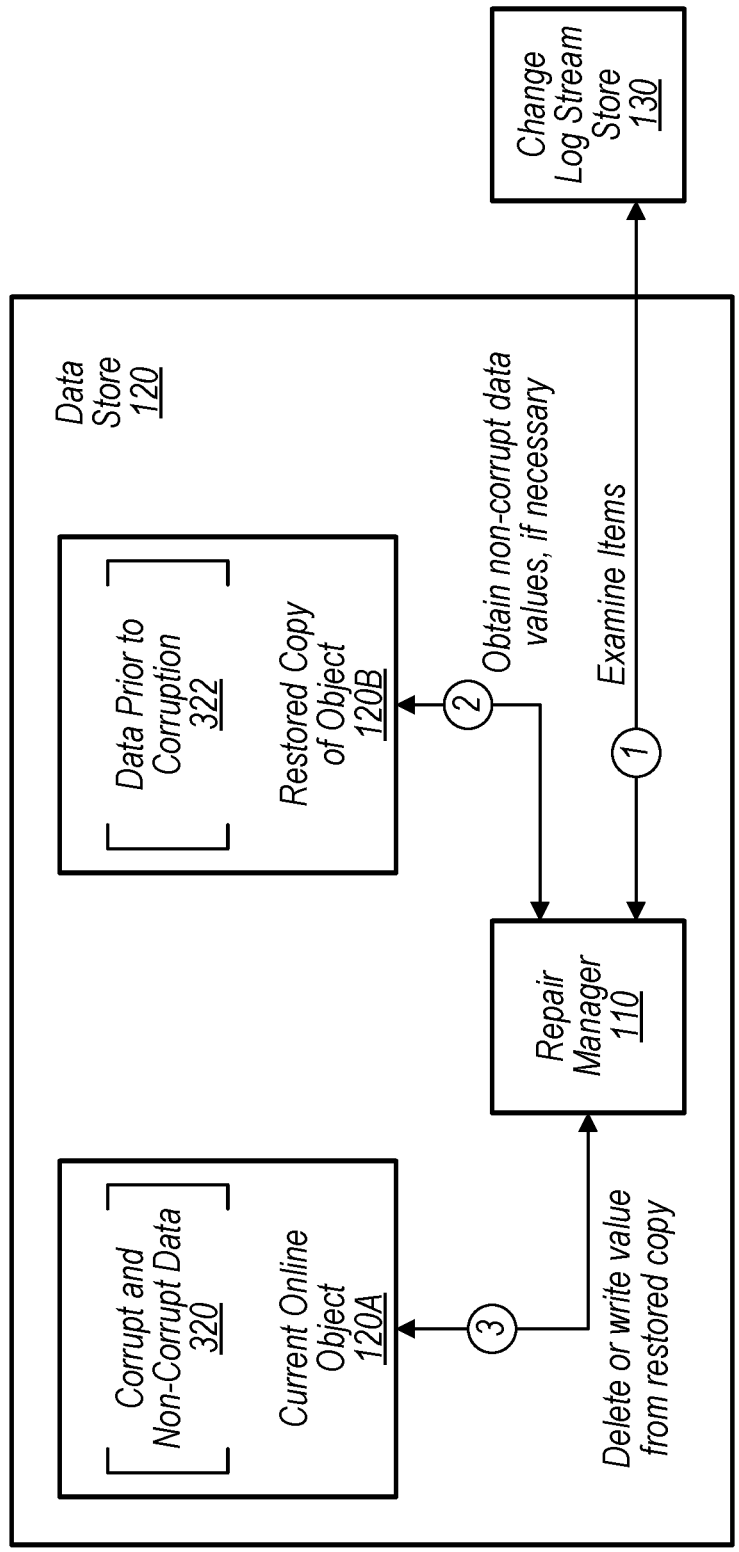
FIG. 4C is a data flow diagram illustrating the flow of data during the restoration process, in accordance with various embodiments.

The source of the non-corrupt data for performing the restoration may come from various sources. FIG. 4A is a flow chart illustrating a technique for restoration of an active data source using data from a change log, according to some embodiments. FIG. 4B is a flow chart illustrating a technique for restoration of an active data source using data from a restored copy of the data store, according to some embodiments. FIG. 4C is a data flow diagram illustrating the flow of data during the restoration process, in accordance with various embodiments. The techniques and data flows illustrated in FIGS. 4A-C may be performed by components illustrated in FIGS. 1, 3, 6 and 7 in embodiments.

At block 402 a time window during which items in a data object in a data store were corrupted is determined. For example, the time window may be received via interface 112 (e.g., illustrated in FIG. 6, described below) of repair manager 110 from an administrator for the system, or the system may automatically determine the time window by an automated corrupt data detection process that relies upon applying filter condition to change logs to determine corruption events.

A change log for the data object in the data store that indicates changes to items in the data object during the time window is obtained (block 404). For instance, the filter engine 116 may obtain or identify the change log (e.g., one of change logs 132A-N) from change log stream store 130 and obtain the portion of that change log that corresponds to the time window.

An item may be selected from the change log and examined (e.g., by the filter engine 116) based on application of filter conditions that identifies the item as corrupt (block 408). For an item that is determined to be corrupt (e.g., identified by the filter conditions, block 408, yes) a repair operation for the item may be determined. For example, the repair manager may determine the repair option in accordance with the technique illustrated in FIG. 5, described below. At block 412, if needed (e.g., to correct a delete operation that corrupted the item) data for the item from the change log may be used to perform the repair operation to the data object while the data store continues to accept read and write operations for the data object from a client or clients of the data store. For example, the repair manager 110 may perform the repair operation to a live, production data store. In at least some embodiments (e.g., when the repair operation is a delete operation that does not require data to perform the restoration) the system may perform the repair operation without determining data for the item. The process may then continue to block 414. If the item is not determined to be corrupt (e.g., is not identified by the filter conditions, (408, no)) the process may proceed to block 414.

At block 414, a determination is made as to whether there are more items in the change log. For example, the repair manager 110 may attempt to obtain another item from the change log. If there are more items (414, yes) the process may return to block 406 and repeat until all the items in the change log have been examined. If there are no more items in the change log (e.g., if all of the items have been examined for the time period (414, no)) the system may indicate that the repair is complete. For instance, the repair manager may send a message that the restoration process is complete in response to the request to perform the restoration.

FIG. 4B is a flow chart illustrating a technique for restoration of an active data source using data from a restored copy of the data store, according to some embodiments. At block 420, a time window during which items in a data object of a data store were corrupted is determined. At block 422 generation of a restored copy of the data object restored to a time immediately prior to the time window is requested. For example, repair controller 114 may transmit a request to data protection manager 304 requesting generation of the restored copy and the data protection manager 304 may apply a change log from change log stream store 130 to a copy of the object to generate the restored copy of the object at a time just prior to the time window (e.g., just prior to the data becoming corrupted). In some embodiments, the repair manager may perform the functionality attributed to the data protection manager 304.

At block 424, a portion of a change log associated with the data object and that indicates changes made to items in the data object during the time window is selected (e.g., by the repair manager 110). In some embodiments, the repair manager may request the data protection manager to obtain the portion of the change log. Block 426 illustrates that an item from the change log is selected and block 428 illustrates that a determination of whether an item is identified as corrupt based on an examination that includes application of the filter conditions. If the data is identified as corrupt (block 428, yes), a repair operation for the item is determined. For example, repair manager 110 may apply a technique similar to the technique illustrated in FIG. 5 to determine the repair operation. Block 432 illustrates that, if needed (e.g., to correct a delete that corrupted the item) data from the restored copy is used to perform the repair operation while the data store continues to accept read and write operations from a client or clients of the data store for the data object. In at least some embodiments (e.g., when the repair operation is a delete operation that does not require data to perform the restoration) the system may perform the repair operation without determining data for the item. The process may then proceed to block 434. In the case where the item is not identified as corrupt by the filter conditions (block 428, no) the process may then proceed to block 434. At block 434, if there are more items in the change log (block 434, yes) the process may return to block 426 and iterate. If there are not more items in the change log (block 434, no) completion of the repair is indicated. For example, the interface may indicate the restoration process is complete. In instances where the restoration process is unable to complete the restoration, an error message may be transmitted or displayed via the interface.

FIG. 4C is a data flow diagram illustrating the flow of data during the restoration process, in accordance with various embodiments. The data flow depicted in FIG. 4C may be performed by components in FIGS. 1, 3, and 7, in embodiments.

The data flow illustrated in FIG. 4C is illustrated at a high-level and corresponds to the process illustrated in FIGS. 2, 4A-B, and 5, leaving out some steps, in some embodiments. Generally, a three-step process is illustrated where (1) the repair manager examines items in a change log from the change log stream store 130 using filter criteria to determine which items in the log are associate with a corrupt entry in the current online object 120A. For identified corrupt items in the change log, the repair manager may (2) obtain non-corrupt data values (if necessary, no data may be necessary of the restoration operation is a delete) from a restored copy of the object 120B. The restored copy of the object 120B may include data for the item at a state prior to the corruption 322. The repair manager 110 may delete or write the value obtained from the restored copy of the object to the currently on-line object 120A which includes both corrupt and non-corrupt data 320, at least until the restoration process is complete.

FIG. 5 is an example technique of determining repair operations for restoration of an active NoSQL database table, according to some embodiments. In some embodiments, the technique illustrated in FIG. 5 is similar to the functionality illustrated in blocks 208, 210, 410, 412, 430, 432 of FIGS. 2, 4A and 4B. The functionality may be performed by components illustrated in FIGS. 1, 3 and 7, for example.

At block 504, the system determines whether an entry in the change log indicates a change type of "insert", "modification", or "remove." FIG. 5 illustrates that for the "Insert" change type, the repair operation is determined to be "delete" (block 506) and performance of the operation includes performing a delete operation for the item in the data object (block 508).

FIG. 5 illustrates that for the "Modification" change type the repair operation is determined to be "update" (block 510) that non-corrupt data for the item is retrieved for the item from a corresponding log or from a corresponding restored object (block 512). Performance of the operation includes performance of the insert operation for the item in the data object (block 514).

FIG. 5 illustrates that for the "Remove" change type the repair operation is determined to be "insert" (block 516) and non-corrupt data for the item is retrieved from a corresponding log or from a corresponding restored object (block 518). Performance of the operation includes performing the insert operation for the item in the data object (block 520). Other change types and other repair operations are contemplated without departing from the scope of this disclosure.

Figure 6:
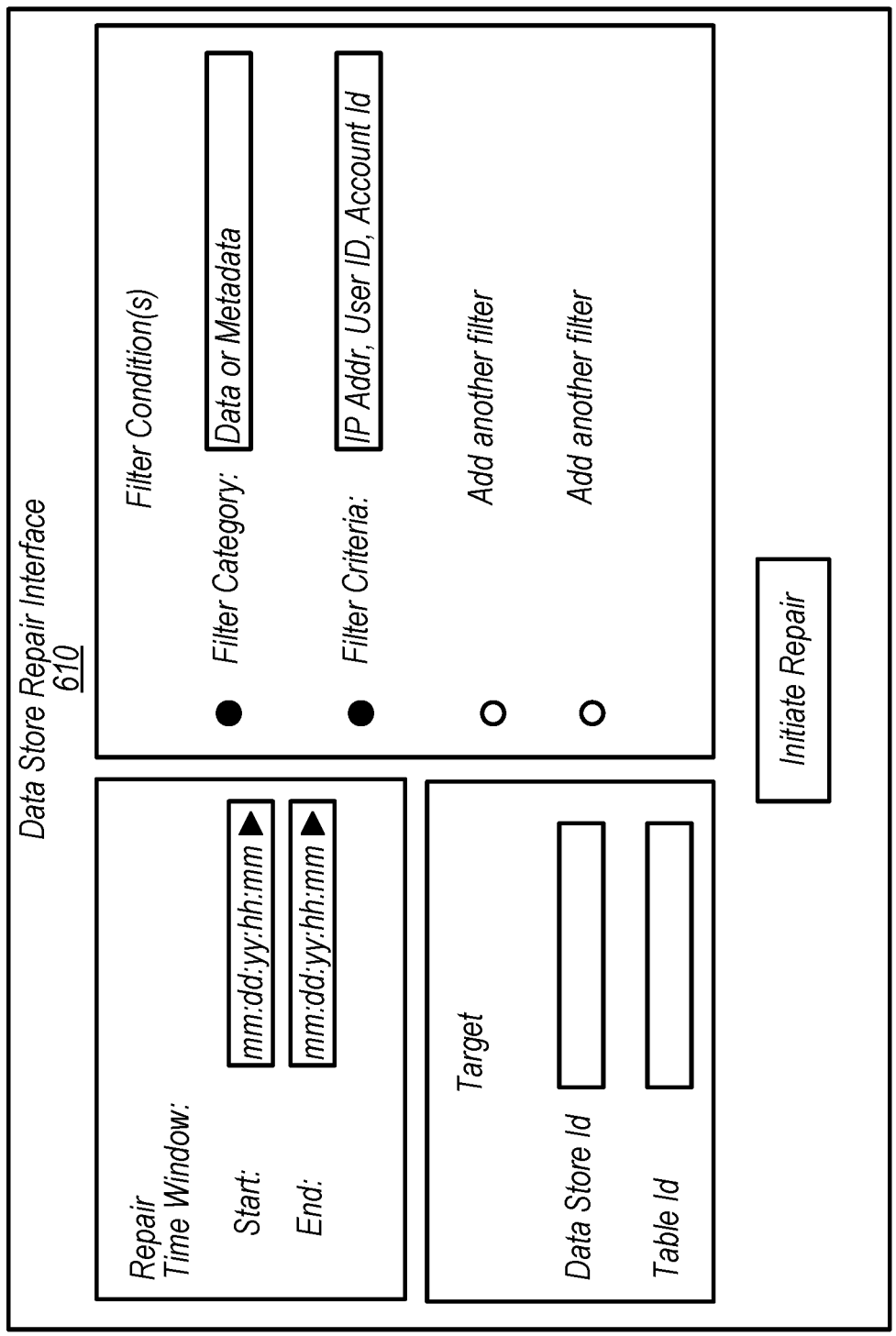
FIG. 6 is an example of a graphical user interface for receiving information for and initiating restoration of a data source, according to some embodiments.

FIG. 6 is an example of a graphical user interface for receiving information for and initiating restoration of an active data source, according to some embodiments. Other types of interfaces are contemplated for achieving similar functionality, such as command line interfaces or APIs, etc. FIG. 6 illustrates a data store repair interface 610 that includes several sections. In the repair time window section, start and end times for a repair window may be specified. The system may receive the specified start and end times for the repair window and use them to determine a portion of a change log to apply filter criteria to identify corrupt data while leaving non-corrupt updates, for example. In some embodiments, an automated corrupt data identification service may identify start and end times for the restoration.

A filter criteria section of data store repair interface 610 illustrates that one or more filter criterion may be specified. The interface may include interface elements for specifying a filter category, such as whether the filter is applied to data or metadata, in embodiments. The illustrated embodiment depicts an entry for filter criteria and a non-exhaustive list of example includes an Internet Protocol address, a userID, and an accountID. Other interface elements indicate that additional filter criteria may be added.

A target section of data store repair interface 610 illustrates that one or more interface elements may obtain information that identifies the object to be restored.

Figure 7:
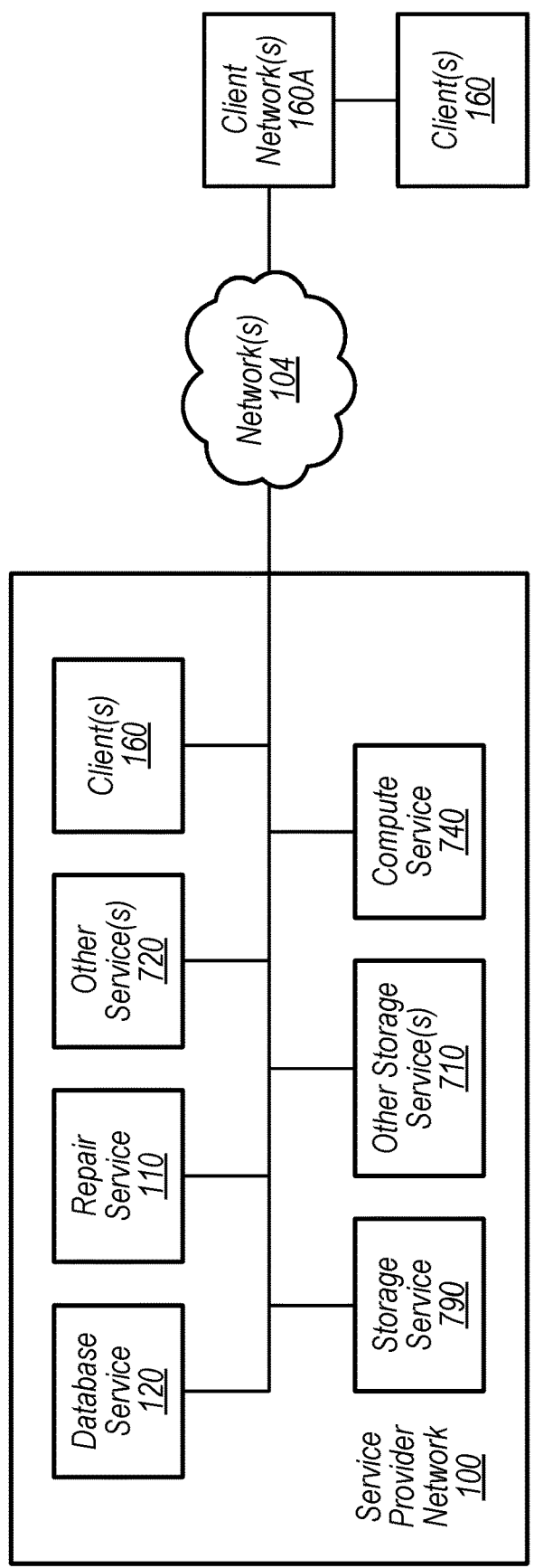
FIG. 7 is a block diagram illustrating logical relationships between various services of a service provider that provides restoration of an active data source as a service to clients of the service provider, according to some embodiments.

FIG. 7 is a block diagram illustrating a service provider network that implements restoration of an active data source, according to some embodiments. Depicted is a repair service 110 similar to the functionality provided by repair manager 110 illustrated in FIGS. 1 and 3 that may perform some of the steps illustrated in at least FIGS. 2, 4A-C, 5 and 6. The repair service 110 is illustrated as part of service provider network 100 that includes database service 120, storage service 790, compute service 740, client(s) 760 as well as other storage services 710 and other services 720. In at least the illustrated embodiment, the service provider network 100 is communicatively coupled to client networks 160A and clients 160 via network(s) 104. Service provider network 100 may provide one or more services to a plurality of distinct customers, each distinct customer comprising a distinct customer network, in embodiments. One or more of the components in FIG. 7 may be implemented by one or more of the computing nodes 1200 illustrated in FIG. 12, in embodiments.

The methods described herein may in various embodiments be implemented by any combination of hardware and software. For example, in one embodiment, the methods may be implemented by program instructions executed on or across a distributed computer system that includes multiple processors. The program instructions may be configured to implement the functionality described herein (e.g., the functionality of various servers and other components that implement the restoration of a data source described herein.

Figure 8:
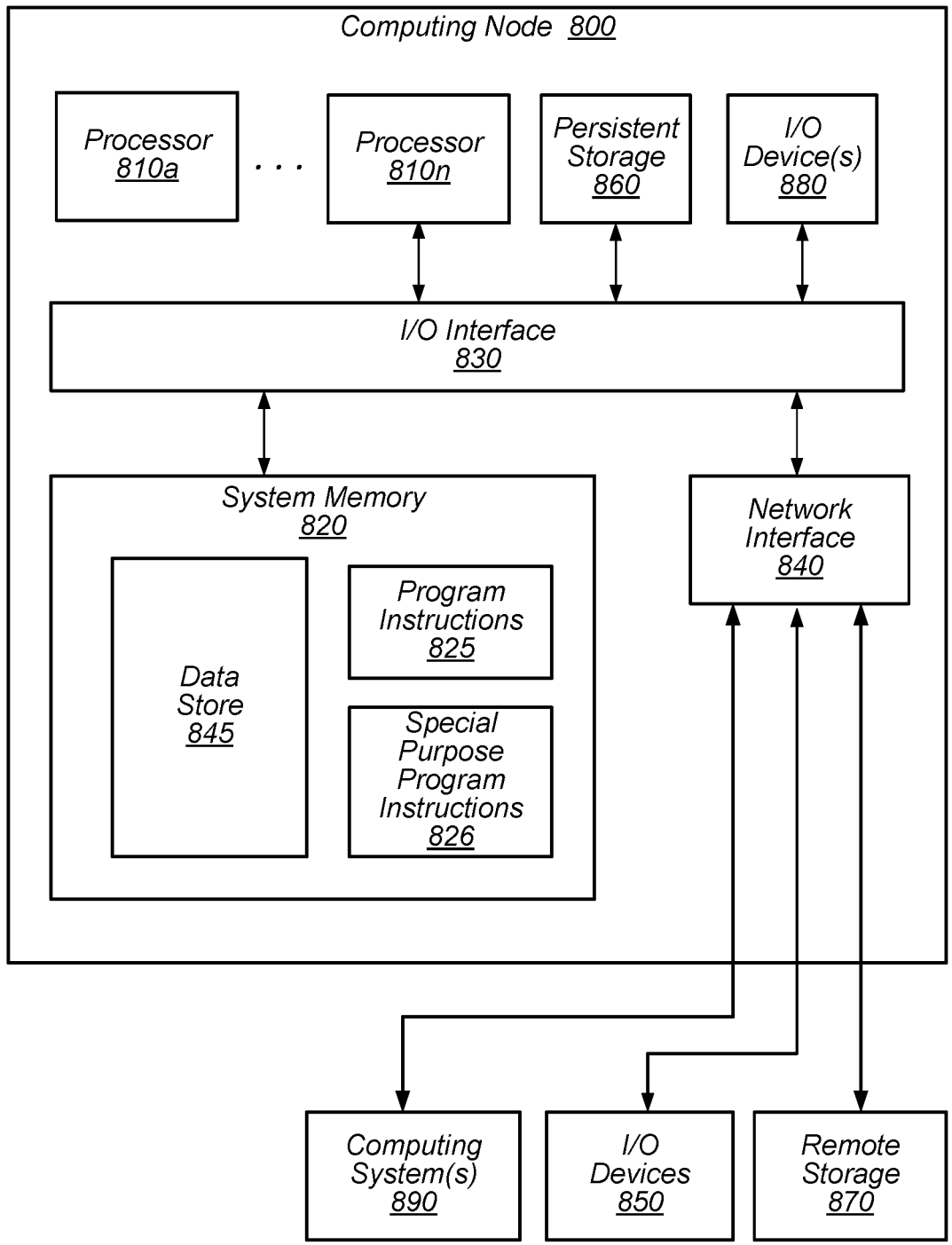
FIG. 8 is a block diagram illustrating a computer system configured to implement at least a portion of a system that includes continuous data protection, according to various embodiments.

FIG. 8 is a block diagram illustrating a computing node configured to implement at least a portion of the technique for restoration of a data source, according to various embodiments described herein. For example, computing node 800 may represent a computing node that implements one or more of the techniques or components described herein for providing restoration of a data source, according to various embodiments. In various embodiments, computing node 800 may be configured to implement any or all of the components of a system that implements a system for restoration of a data source, and a corresponding continuous data protection system, or multiple computing nodes similar to or different from computing node 800 may collectively provide this functionality. For example, in various embodiments, one or more computing nodes 800 may implement database service 120, repair manager 110, change log stream store 130, data store archive 306, or clients 160. Additionally, any number of storage node instances may each host one or more replicas of various data partitions and/or metadata associated therewith. For example, any given storage node instance may host a replica acting as master replica for its replica group and/or a replica acting as a slave replica in its replica group.

Similarly, one or more computing nodes 800 may implement a key-value durable backup storage system (or an interface or other component thereof), in different embodiments. Computing node 800 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

In some embodiments that include multiple computing nodes 800, all of the computing nodes 800 may include the same or similar hardware components, software components, and functionality, while in other embodiments the computing nodes 800 comprising a computing system configured to implement the functionality described herein may include a wide variety of hardware components, software components, and functionality. In some embodiments, multiple computing nodes 800 that collectively implement restoration of a data source may be components of a larger shared resource system or grid computing system. It is noted that different elements of the system described herein may be implemented by different computing nodes 800. For example, a computer system that supports the functionality described herein for performing restoration of a data source may be implemented on the same computing nodes 800 on which clients (through which a customer or subscriber may access the system) execute, or on one or more other computing nodes 800, in different embodiments. In another example, different subsystems (e.g., a Web service interface, an admission control subsystem, a service request subsystem; and/or one or more Web servers or other components) may be implemented on or across multiple ones of the computing nodes, and each of the computing nodes may be similar to computing node 800.

In the illustrated embodiment, computing node 800 includes one or more processors 810 (any of which may include multiple cores, which may be single or multi-threaded) coupled to a system memory 820 via an input/output (I/O) interface 830. Computing node 800 further includes a network interface 840 coupled to I/O interface 830. In various embodiments, computing node 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA. Similarly, in a distributed computing system such as one that collectively implements a scalable database service or a remote storage service in which tables are baked up, each of the computing nodes may implement the same ISA, or individual computing nodes and/or replica groups of nodes may implement different ISAs.

The computing node 800 also includes one or more network communication devices (e.g., network interface 840) for communicating with other systems and/or components over a communications network (e.g. Internet, LAN, etc.). For example, a client application executing on computing node 800 may use network interface 840 to communicate with a server application executing on a single server or on a cluster of servers that implement a distributed system. In another example, an instance of a server application executing on computing node 800 may use network interface 840 to communicate with other instances of the server application that may be implemented on other computer systems.

In the illustrated embodiment, computing node 800 also includes one or more persistent storage devices 860 and/or one or more I/O devices 880. In various embodiments, persistent storage devices 860 may correspond to disk drives, tape drives, solid state memory, other mass storage devices, or any other persistent storage device. Computing node 800 (or a distributed application or operating system operating thereon) may store instructions and/or data in persistent storage devices 860, as desired, and may retrieve the stored instruction and/or data as needed.

Computing node 800 includes one or more system memories 820 that are configured to store instructions and/or data (shown as program instructions 825 and data store 845, respectively) that are accessible by processor(s) 810. In various embodiments, system memories 820 may be implemented using any suitable memory technology, (e.g., one or more of cache, static random-access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 820 may contain program instructions 825 that are executable by processor(s) 810 to implement the methods and techniques described herein for restoration of a data source.

In the illustrated embodiment, program instructions and data implementing desired functions, methods or techniques (such as functionality for restoration of a data source using any or all of the mechanisms described herein), are shown stored within system memory 820 as program instructions 825. For example, program instruction 825 may include program instructions that when executed on processor(s) 810 implement any or all of data store 120, repair manager 110, various data stores and archives, and/or any other components, modules, or sub-modules of a system that provides the data storage system and services described herein. Program instructions 825 may also include program instructions configured to implement additional functionality of a system that implements a data storage service not described herein. In some embodiments, program instructions 825 may include program instructions configured to implement functionality of a key-value durable backup storage system or another type of remote storage system suitable for restoration of a data sources, as describe herein. In some embodiments, program instructions 825 may implement multiple separate clients, server nodes, and/or other components.

It is noted that in some embodiments, program instructions 825 may include instructions and data implementing desired functions that are not directly executable by processor(s) 810 but are represented or encoded in an abstract form that is translatable to instructions that are directly executable by processor(s) 810. For example, program instructions 825 may include instructions specified in an ISA that may be emulated by processor 810, or by other program instructions 825 executable on processor(s) 810. Alternatively, program instructions 825 may include instructions, procedures or statements implemented in an abstract programming language that may be compiled or interpreted in the course of execution. As non-limiting examples, program instructions 825 may be encoded in platform native binary, any interpreted language such as Java™ byte-code, or may include code specified in a procedural or object-oriented programming language such as C or C++, a scripting language such as perl, a markup language such as HTML or XML, or any other suitable language or in any combination of languages.

In some embodiments, program instructions 825 may include instructions executable to implement an operating system (not shown), which may be any of various operating systems, such as UNIX, LINUX, Solaris™, MacOS™, Windows™, etc. Any or all of program instructions 825 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computing node 800 via I/O interface 830. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing node 800 as system memory 820 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 840.

In other embodiments, program instructions and/or data as described herein for implementing a data storage service that employs the techniques described above may be received, sent or stored upon different types of computer-readable media or on similar media separate from system memory 820 or computing node 800. Program instructions and data stored on or across one or more computer-readable storage medium may be transmitted to a computing node 800 for execution on a processor 810 (or across multiple processors) by transmission media or signals such as electrical, electromagnetic, or digital signals, which may be conveyed via a communication medium such as a network and/or a wireless link, such as may be implemented via network interface 840. In some embodiments, system memory 820 may include data in data store 845 and/or program instructions 825 and/or special purpose instructions 826, which may be configured as described herein. In some embodiments, data store 845 may store the snapshots, or the change stream items, for example. In some embodiments, special purpose program instructions 826 may include instructions that implement the repair manager 110, the data store 120, or the change log stream store 130, for example.

In some embodiments, system memory 820 may include data store 845, which may be configured as described herein. For example, the information described herein as being stored by the scalable, distributed data storage system (e.g., table data, metadata for tables, partitions and backups, transaction information, configuration information for tables and/or partitions, or other information used in performing the methods described herein may be stored in data store 845 or in another portion of system memory 820 on one or more nodes, in persistent storage 860, and/or in remote storage 870, in various embodiments. In some embodiments, and at various times, system memory 820 (e.g., data store 845 within system memory 820), persistent storage 860, and/or remote storage 870 may store copies of table data (e.g., partition data) backup copies of table and/or partition data, metadata associated with tables, partitions, backups, transactions and/or their states, database configuration information, and/or any other information usable in implementing the methods and techniques described herein. In some embodiments, remote storage 870 may be a key-value durable storage system in which tables (and/or partitions thereof) are backed up and from which they are restored, as described herein.

Data store 845 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, resource capacity data, resource usage data, provisioned resource utilization data, reserved resource data, resource reservation IDs, resource reservation timeout period values, parameter values for various partition management policies, limits, or constraints, and/or information about candidate partition management operations).

In one embodiment, I/O interface 830 may be configured to coordinate I/O traffic between processor(s) 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computing node 800 and other devices attached to a network, such as other computer systems 890 (which may implement one or more server nodes and/or clients of a scalable, distributed data storage system and/or a remote key-value durable storage system), for example. In addition, network interface 840 may be configured to allow communication between computing node 800 and various I/O devices 850 and/or remote storage 870), or between other nodes in a system providing shared computing services. In general, network interface 840 may be configured to allow data to be exchanged between computing node 800 and any of a variety of communication devices, external storage devices, input/output devices and/or other computing devices, in different embodiments.

Input/output devices 850 may, in some embodiments, include one or more display terminals, keyboards, keypads, touchpads, scanning devices, voice or optical recognition devices, or any other devices suitable for entering or retrieving data by one or more computing nodes 800. Multiple input/output devices 850 may be present in computing node 800 or may be distributed on various nodes of a distributed system that includes computing node 800. In some embodiments, similar input/output devices may be separate from computing node 800 and may interact with one or more nodes of a distributed system that includes computing node 800 through a wired or wireless connection, such as over network interface 840. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol. In various embodiments, computing node 800 may include more, fewer, or different components than those illustrated in FIG. 8 (e.g., displays, video cards, audio cards, peripheral devices, other network interfaces such as an ATM interface, an Ethernet interface, a Frame Relay interface, etc.)

Storage service clients (e.g., users, subscribers and/or client applications) may interact with a data storage service such as that described herein in various ways in different embodiments, such as to submit requests for service (including, but not limited to, requests to create and/or partition tables, requests to store, retrieve and/or update items in tables, or requests to split, move, or otherwise repartition a table), and to receive results. For example, some subscribers to the service may have physical access to computing node 800, and if so, may interact with various input/output devices 850 to provide and/or receive information. Alternatively, other clients/users may use client computing systems to access the system, such as remotely via network interface 840 (e.g., via the Internet and/or the World Wide Web). In addition, some or all of the computing nodes of a system providing the service may provide various feedback or other general types of information to clients/users (e.g., in response to user requests) via one or more input/output devices 850.

It is noted that any of the distributed system embodiments described herein, or any of their components, may be implemented as one or more web services. For example, a front-end module or administrative console of a Web services platform may present data storage services and/or database services to clients as web services. In some embodiments, a web service may be implemented by a software and/or hardware system designed to support interoperable machine-to-machine interaction over a network. A web service may have an interface described in a machine-processable format, such as the Web Services Description Language (WSDL). Other systems may interact with the web service in a manner prescribed by the description of the web service's interface. For example, the web service may define various operations that other systems may invoke, and may define a particular application programming interface (API) to which other systems may be expected to conform when requesting the various operations.

In various embodiments, a web service may be requested or invoked through the use of a message that includes parameters and/or data associated with the web services request. Such a message may be formatted according to a particular markup language such as Extensible Markup Language (XML), and/or may be encapsulated using a protocol such as Simple Object Access Protocol (SOAP). To perform a web services request, a web services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

Those skilled in the art will appreciate that computing node 800 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 800 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 800 may be transmitted to computing node 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the distributed data store is implemented using a different storage paradigm.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied.

The invention claimed is:

1. A system, the system comprising:
   a plurality of storage nodes, each of which comprises one or more storage devices or logical storage volumes that implement a data store to store data objects, to provide an interface for read and write operations to the data objects for one or more clients, and to emit changes to data objects to respective change logs for the data objects; and
   a repair manager to perform:
      receiving a time window during which one or more items in a particular one of the data objects in the data store were corrupted;
      examining items in a portion of the change log for the particular data object, wherein the portion of the change log indicates changes made to items in the particular data object during the time window, and wherein examining items comprises applying one or more filter condition to each item, or to metadata for each item to identify individual items that are corrupted; and
      for each individual item identified to be corrupted:
         determining a repair operation for the individual item; and
         performing the repair operation to the particular data object in the data store while the data store continues to accept read and write operations for the particular data object from one or more clients of the data store.

2. The system recited in claim 1,
   wherein the repair manager is to perform providing an interface for receiving a specification of the one or more filter conditions, and
   wherein the one or more filter conditions include one or more of:

a data value or data value range for one or more attributes of items in the particular data object in the data store, a data type for one or more attributes of items in the particular data object in the data store, or a metadata value for items in the particular data object in the data store, wherein the metadata value specifies a source identifier or location identifier for an item change.

3. The system recited in claim 1, wherein said determining the repair operation for the individual item is based on determining a change type from an entry of the change log for the item, said determining the change type comprising:

in response to determining that the change type is an item insert, determining the repair operation to be a delete of the item from the particular data object in the data store, in response to a determining that the change type is an item modification, determining the repair operation to be an update of the item in the particular data object in the data store, or in response to determining that the change type is an item remove, determining the repair operation to be an insert of the item in the particular data object in the data store.

4. The system recited in claim 1, wherein the repair manager is to perform:

requesting creation of a restored copy of the particular data object in the data store restored at a time immediately prior to the time window, and in response to determining that the repair operation is an insert operation, determining, from the restored copy of the particular data object in the data store, data for the item that is valid prior the time window, and wherein said performing the repair operation comprises performing the insert operation to the particular data object in the data store to update the item in the particular data object in the data store with the determined data.

5. A method, comprising:

performing by one or more computing devices:

determining a time window during which one or more items in a particular one of a plurality of data objects in a data store were corrupted, wherein the data store provides an interface for read and write operations to the data objects for one or more clients, and emits changes to data objects to respective change logs for the data objects;

examining items in a portion of the change log for the particular data object in the data store, wherein the portion of the change log indicates changes made to items in the particular data object in the data store during the time window, and wherein examining items comprises applying one or more filter conditions to each item, or to metadata for each item to identify individual items that are corrupted; and for each individual item identified to be corrupted:

determining a repair operation for the individual item; and performing the repair operation to the particular data object in the data store while the data store continues to accept read and write operations the particular data object from one or more clients of the data store.

6. The method as recited in claim 5, the method further comprising:

providing an interface for specification of a corruption time window; and receiving an indication of the time window via the interface.

7. The method as recited in claim 5, the method further comprising:

providing an interface for receiving a specification of the one or more filter conditions.

8. The method as recited in claim 7, wherein the one or more filter conditions include one or more of:

a data value or data value range for one or more attributes of items in the particular data object in the data store, a data type for one or more attributes of items in the particular data object in the data store, or a metadata value for items in the particular data object in the data store, wherein the metadata value specifies a source identifier or location identifier for an item change.

9. The method recited in claim 5, further comprising:

wherein said determining the repair operation for the individual item is based on determining a change type from an entry of the change log for the item, said determining the repair operation comprising:

in response to determining that the change type is an item insert, determining the repair operation to be a delete of the item from the particular data object in the data store, in response to a determining that the change type is an item modification, determining the repair operation to be an update of the item in the particular data object in the data store, or in response to determining that the change type is an item remove, determining the repair operation to be an insert of the item in the particular data object in the data store.

10. The method recited in claim 5, the method further comprising:

in response to determining that the repair operation is an update operation, determining, for the item, data from the change log that is valid prior the time window;

wherein said performing the repair operation comprises performing the update operation to the particular data object in the data store to update the item in the particular data object in the data store with the determined data.

11. The method recited in claim 5, further comprising:

in response to determining that the repair operation is an insert operation, determining, for the item, data from the change log that is valid prior the time window;

wherein said performing the repair operation comprises performing the insert operation to the particular data object in the data store to insert the item in the particular data object in the data store with the determined data.

12. The method recited in claim 5, further comprising:

requesting creation of a restored copy of the particular data object in the data store restored at a time immediately prior to the time window, and in response to determining that the repair operation is an update operation, determining, for the item, data from the restored copy of the particular data object in the data store that is valid prior the time window, wherein said performing the repair operation comprises performing the update operation to the particular data object in the data store to update the item in the particular data object in the data store with the determined data.

13. One or more non-transitory computer-readable storage media storing program instruction that when executed on or across one or more processors, cause the one or more processors to implement a repair manager to perform:
   determining a time window during which one or more items in a NoSQL database table were corrupted;
   selecting a portion of a change log for the NoSQL database table, wherein the portion of the change log indicates changes made to items in the NoSQL database table during the time window; and
   for individual items from the portion of the change log:
      determining a repair operation for the individual item; and
      performing the repair operation to the NoSQL database table while the NoSQL database table continues to accept read and write operations from one or more clients of the NoSQL database table.

14. The non-transitory computer-readable storage medium in claim 13, storing further program instructions that cause the repair manager to perform:
   requesting creation of a restored copy of the NoSQL database table restored at a time immediately prior to the time window, and
   in response to determining that the repair operation is an insert operation, determining, from the restored copy of the NoSQL database table, data for the item that is valid prior the time window, and
   wherein said performing the repair operation comprises performing the insert operation to the NoSQL database table to update the item in the NoSQL database table with the determined data.

15. The non-transitory computer-readable storage medium in claim 13, storing further program instruction that when executed on or across one or more processors perform:
   providing an interface for specification of a corruption time window; and
   receiving an indication of the time window via the interface.

16. The non-transitory computer-readable storage medium in claim 13, storing further program instruction that when executed on or across one or more processors perform:
   providing an interface for receiving a specification of the one or more filter conditions,
   wherein the one or more filter conditions include one or more of:
      a data value or data value range for one or more attributes of items in the NoSQL database table,
      a data type for one or more attributes of items in the NoSQL database table, or
      a metadata value for items in the NoSQL database table, wherein the metadata value specifies a source identifier or location identifier for an item change.

17. The non-transitory computer-readable storage medium in claim 13, storing further program instructions, wherein to perform said determining the repair operation for the individual item, the further program instructions that when executed on or across one or more processors perform said determining the repair operation for the individual item based on determining a change type from an entry of the change log for the item, said determining the repair operation comprising:
   in response to determining that the change type is an item insert, determining the repair operation to be a delete of the item from the NoSQL database table,
   in response to a determining that the change type is an item modification, determining the repair operation to be an update of the item in the NoSQL database table, or
   in response to determining that the change type is an item remove, determining the repair operation to be an insert of the item in the NoSQL database table.

18. The non-transitory computer-readable storage medium in claim 13, storing further program instruction that when executed on or across one or more processors perform:
   in response to determining that the repair operation is an update operation, determining, for the item, data from the change log that is valid prior the time window;
   wherein said performing the repair operation comprises performing the update operation to the NoSQL database table to update the item in the NoSQL database table with the determined data.

19. The non-transitory computer-readable storage medium in claim 13, storing further program instruction that when executed on or across one or more processors perform:
   in response to determining that the repair operation is an insert operation, determining, for the item, data from the change log that is valid prior the time window;
   wherein said performing the repair operation comprises performing the insert operation to the NoSQL database table to insert the determined data in the NoSQL database table for the item.

20. The non-transitory computer-readable storage medium in claim 13, storing further program instruction that when executed on or across one or more processors perform:
   requesting creation of a restored copy of the NoSQL database table restored at a time immediately prior to the time window, and
   in response to determining that the repair operation is an update operation, determining, for the item, data from the restored copy of the NoSQL database table that is valid prior the time window,
   wherein said performing the repair operation comprises performing the update operation to the NoSQL database table to update the item in the NoSQL database table with the determined data.

* * * * *